US009699117B2

(12) United States Patent
Koganti et al.

(10) Patent No.: US 9,699,117 B2
(45) Date of Patent: Jul. 4, 2017

(54) INTEGRATED FIBRE CHANNEL SUPPORT IN AN ETHERNET FABRIC SWITCH

(71) Applicant: BROCADE COMMUNICATIONS SYSTEMS, INC., San Jose, CA (US)

(72) Inventors: Phanidhar Koganti, Hyderabad (IN); Suresh Vobbilisetty, San Jose, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 175 days.

(21) Appl. No.: 13/669,357

(22) Filed: Nov. 5, 2012

(65) Prior Publication Data
US 2013/0114600 A1 May 9, 2013

Related U.S. Application Data

(60) Provisional application No. 61/557,268, filed on Nov. 8, 2011.

(51) Int. Cl.
*H04L 12/26* (2006.01)
*H04L 12/931* (2013.01)
(Continued)

(52) U.S. Cl.
CPC ........ *H04L 49/351* (2013.01); *H04L 12/4625* (2013.01); *H04L 49/357* (2013.01); *H04L 45/66* (2013.01); *H04L 2012/4629* (2013.01)

(58) Field of Classification Search
CPC ......... H04L 12/00; H04L 12/24; H04L 12/26; H04L 12/28; H04L 12/56; H04L 12/62;
(Continued)

(56) References Cited

U.S. PATENT DOCUMENTS 5,390,173 A 2/1995 Spinney
5,802,278 A 9/1998 Isfeld
(Continued)

FOREIGN PATENT DOCUMENTS

CN 102801599 11/2012
EP 0579567 5/1993
(Continued)

OTHER PUBLICATIONS

"Switched Virtual Internetworking moves beyond bridges and routers", Sep. 23, 1994, No. 12, New York, US.
(Continued)

*Primary Examiner* — Kevin C Harper
(74) *Attorney, Agent, or Firm* — Shun Yao; Park, Vaughan, Fleming & Dowler LLP

(57) ABSTRACT

One embodiment of the present invention provides a switch. The switch includes a packet processor and a device management module. During operation, the packet processor constructs a notification message containing a Transparent Interconnection of Lots of Links (TRILL) Routing Bridge (RBridge) identifier associated with a Fiber Channel router. The device management module operates in conjunction with the packet processor and terminates TRILL forwarding for a received TRILL packet with the RBridge identifier as an egress RBridge identifier.

20 Claims, 11 Drawing Sheets

(51) Int. Cl.
*H04L 12/46* (2006.01)
*H04L 12/721* (2013.01)

(58) Field of Classification Search
CPC ......... H04L 45/00; H04L 49/00; H04L 49/10;
H04L 49/70; H04L 45/04; H04L 45/586
USPC .................................................. 370/215–405
See application file for complete search history.

(56) References Cited

U.S. PATENT DOCUMENTS

| | | |
|---|---|---|
| 5,878,232 A | 3/1999 | Marimuthu |
| 5,879,173 A | 3/1999 | Poplawski |
| 5,959,968 A | 9/1999 | Chin |
| 5,973,278 A | 10/1999 | Wehrli, III |
| 5,983,278 A | 11/1999 | Chong |
| 5,995,262 A | 11/1999 | Hirota |
| 6,041,042 A | 3/2000 | Bussiere |
| 6,085,238 A | 7/2000 | Yuasa |
| 6,092,062 A | 7/2000 | Lohman |
| 6,104,696 A | 8/2000 | Kadambi |
| 6,185,214 B1 | 2/2001 | Schwartz |
| 6,185,241 B1 | 2/2001 | Sun |
| 6,295,527 B1 | 9/2001 | McCormack |
| 6,331,983 B1 | 12/2001 | Haggerty |
| 6,438,106 B1 | 8/2002 | Pillar |
| 6,498,781 B1 | 12/2002 | Bass |
| 6,542,266 B1 | 4/2003 | Phillips |
| 6,553,029 B1 | 4/2003 | Alexander |
| 6,571,355 B1 | 5/2003 | Linnell |
| 6,583,902 B1 | 6/2003 | Yuen |
| 6,633,761 B1 | 10/2003 | Singhal |
| 6,636,963 B1 | 10/2003 | Stein |
| 6,771,610 B1 | 8/2004 | Seaman |
| 6,870,840 B1 | 3/2005 | Hill |
| 6,873,602 B1 | 3/2005 | Ambe |
| 6,937,576 B1 | 8/2005 | DiBenedetto |
| 6,956,824 B2 | 10/2005 | Mark |
| 6,957,269 B2 | 10/2005 | Williams |
| 6,975,581 B1 | 12/2005 | Medina |
| 6,975,864 B2 | 12/2005 | Singhal |
| 7,016,352 B1 | 3/2006 | Chow |
| 7,061,877 B1 | 6/2006 | Gummalla |
| 7,062,177 B1 | 6/2006 | Grivna |
| 7,173,934 B2 | 2/2007 | Lapuh |
| 7,197,308 B2 | 3/2007 | Singhal |
| 7,206,288 B2 | 4/2007 | Cometto |
| 7,310,664 B1 | 12/2007 | Merchant |
| 7,313,637 B2 | 12/2007 | Tanaka |
| 7,315,545 B1 | 1/2008 | Chowdhury et al. |
| 7,316,031 B2 | 1/2008 | Griffith |
| 7,330,897 B2 | 2/2008 | Baldwin |
| 7,380,025 B1 | 5/2008 | Riggins |
| 7,397,794 B1 | 7/2008 | Lacroute |
| 7,430,164 B2 | 9/2008 | Bare |
| 7,453,888 B2 | 11/2008 | Zabihi |
| 7,477,894 B1 | 1/2009 | Sinha |
| 7,480,258 B1 | 1/2009 | Shuen |
| 7,508,757 B2 | 3/2009 | Ge |
| 7,558,195 B1 | 7/2009 | Kuo |
| 7,558,273 B1 | 7/2009 | Grosser, Jr. |
| 7,571,447 B2 | 8/2009 | Ally |
| 7,599,901 B2 | 10/2009 | Mital |
| 7,688,736 B1 | 3/2010 | Walsh |
| 7,688,960 B1 | 3/2010 | Aubuchon |
| 7,690,040 B2 | 3/2010 | Frattura |
| 7,706,255 B1 | 4/2010 | Kondrat et al. |
| 7,716,370 B1 | 5/2010 | Devarapalli |
| 7,720,076 B2 | 5/2010 | Dobbins |
| 7,729,296 B1 | 6/2010 | Choudhary |
| 7,787,480 B1 | 8/2010 | Mehta |
| 7,792,920 B2 | 9/2010 | Istvan |
| 7,796,593 B1 | 9/2010 | Ghosh |
| 7,801,021 B1 | 9/2010 | Triantafillis |
| 7,808,992 B2 | 10/2010 | Homchaudhuri |
| 7,836,332 B2 | 11/2010 | Hara |
| 7,843,906 B1 | 11/2010 | Chidambaram et al. |
| 7,843,907 B1 | 11/2010 | Abou-Emara |
| 7,860,097 B1 | 12/2010 | Lovett |
| 7,898,959 B1 | 3/2011 | Arad |
| 7,912,091 B1 | 3/2011 | Krishnan |
| 7,924,837 B1 | 4/2011 | Shabtay |
| 7,937,438 B1 | 5/2011 | Miller |
| 7,937,756 B2 | 5/2011 | Kay |
| 7,945,941 B2 | 5/2011 | Sinha |
| 7,949,638 B1 | 5/2011 | Goodson |
| 7,957,386 B1 | 6/2011 | Aggarwal |
| 8,018,938 B1 | 9/2011 | Fromm |
| 8,027,354 B1 | 9/2011 | Portolani |
| 8,054,832 B1 | 11/2011 | Shukla |
| 8,068,442 B1 | 11/2011 | Kompella |
| 8,078,704 B2 | 12/2011 | Lee |
| 8,090,805 B1 | 1/2012 | Chawla |
| 8,102,781 B2 | 1/2012 | Smith |
| 8,102,791 B2 | 1/2012 | Tang |
| 8,116,307 B1 | 2/2012 | Thesayi |
| 8,125,928 B2 | 2/2012 | Mehta |
| 8,134,922 B2 | 3/2012 | Elangovan |
| 8,155,150 B1 | 4/2012 | Chung |
| 8,160,063 B2 | 4/2012 | Maltz |
| 8,160,080 B1 | 4/2012 | Arad |
| 8,170,038 B2 | 5/2012 | Belanger |
| 8,175,107 B1 | 5/2012 | Yalagandula |
| 8,194,674 B1 | 6/2012 | Pagel |
| 8,195,774 B2 | 6/2012 | Lambeth |
| 8,204,061 B1 | 6/2012 | Sane |
| 8,213,313 B1 | 7/2012 | Doiron |
| 8,213,336 B2 | 7/2012 | Smith |
| 8,230,069 B2 | 7/2012 | Korupolu |
| 8,239,960 B2 | 8/2012 | Frattura |
| 8,249,069 B2 | 8/2012 | Raman |
| 8,270,401 B1 | 9/2012 | Barnes |
| 8,295,291 B1 | 10/2012 | Ramanathan |
| 8,295,921 B2 | 10/2012 | Wang |
| 8,301,686 B1 | 10/2012 | Appajodu |
| 8,339,994 B2 | 12/2012 | Gnanasekaran |
| 8,351,352 B1 | 1/2013 | Eastlake, III |
| 8,369,335 B2 | 2/2013 | Jha |
| 8,369,347 B2 | 2/2013 | Xiong |
| 8,392,496 B2 | 3/2013 | Linden |
| 8,451,717 B2 | 5/2013 | Venkataraman et al. |
| 8,462,774 B2 | 6/2013 | Page |
| 8,467,375 B2 | 6/2013 | Blair |
| 8,520,595 B2 | 8/2013 | Yadav |
| 8,599,850 B2 | 12/2013 | Jha |
| 8,599,864 B2 | 12/2013 | Chung |
| 8,615,008 B2 | 12/2013 | Natarajan |
| 8,619,788 B1 | 12/2013 | Sankaran |
| 8,705,526 B1 | 4/2014 | Hasan |
| 8,706,905 B1 | 4/2014 | McGlaughlin |
| 8,717,895 B2 | 5/2014 | Koponen |
| 8,724,456 B1 | 5/2014 | Hong |
| 8,798,045 B1 | 8/2014 | Aybay |
| 8,804,736 B1 | 8/2014 | Drake |
| 8,806,031 B1 | 8/2014 | Kondur |
| 8,826,385 B2 | 9/2014 | Congdon |
| 8,918,631 B1 | 12/2014 | Kumar |
| 8,937,865 B1 | 1/2015 | Kumar |
| 8,965,296 B2 | 2/2015 | Keathley |
| 8,995,272 B2 | 3/2015 | Agarwal |
| 9,178,793 B1 | 11/2015 | Marlow |
| 9,350,680 B2 | 5/2016 | Thayalan |
| 9,438,447 B2 | 9/2016 | Basso |
| 2001/0005527 A1 | 6/2001 | Vaeth |
| 2001/0055274 A1 | 12/2001 | Hegge |
| 2002/0019904 A1 | 2/2002 | Katz |
| 2002/0021701 A1 | 2/2002 | Lavian |
| 2002/0039350 A1 | 4/2002 | Wang |
| 2002/0054593 A1 | 5/2002 | Morohashi |
| 2002/0087723 A1 | 7/2002 | Williams |
| 2002/0091795 A1 | 7/2002 | Yip |
| 2003/0026290 A1 | 2/2003 | Umayabashi |
| 2003/0041085 A1 | 2/2003 | Sato |
| 2003/0093567 A1 | 5/2003 | Lolayekar |

(56) References Cited

U.S. PATENT DOCUMENTS

| | | |
|---|---|---|
| 2003/0097464 A1 | 5/2003 | Martinez |
| 2003/0097470 A1 | 5/2003 | Lapuh |
| 2003/0123393 A1 | 7/2003 | Feuerstraeter |
| 2003/0147385 A1 | 8/2003 | Montalvo |
| 2003/0174706 A1 | 9/2003 | Shankar |
| 2003/0189905 A1 | 10/2003 | Lee |
| 2003/0189930 A1 | 10/2003 | Terrell |
| 2003/0208616 A1 | 11/2003 | Laing |
| 2003/0216143 A1 | 11/2003 | Roese |
| 2003/0223428 A1 | 12/2003 | Gonzalez |
| 2003/0233534 A1 | 12/2003 | Bernhard |
| 2004/0001433 A1 | 1/2004 | Gram |
| 2004/0003094 A1 | 1/2004 | See |
| 2004/0010600 A1 | 1/2004 | Baldwin |
| 2004/0049699 A1 | 3/2004 | Griffith |
| 2004/0057430 A1 | 3/2004 | Paavolainen |
| 2004/0081171 A1 | 4/2004 | Finn |
| 2004/0088668 A1 | 5/2004 | Hamlin |
| 2004/0095900 A1 | 5/2004 | Siegel |
| 2004/0117508 A1 | 6/2004 | Shimizu |
| 2004/0120326 A1 | 6/2004 | Yoon |
| 2004/0156313 A1 | 8/2004 | Hofmeister et al. |
| 2004/0165595 A1 | 8/2004 | Holmgren |
| 2004/0165596 A1 | 8/2004 | Garcia |
| 2004/0205234 A1 | 10/2004 | Barrack |
| 2004/0213232 A1 | 10/2004 | Regan |
| 2004/0225725 A1 | 11/2004 | Enomoto |
| 2004/0243673 A1 | 12/2004 | Goyal |
| 2005/0007951 A1 | 1/2005 | Lapuh |
| 2005/0044199 A1 | 2/2005 | Shiga |
| 2005/0074001 A1 | 4/2005 | Mattes |
| 2005/0094568 A1 | 5/2005 | Judd |
| 2005/0094630 A1 | 5/2005 | Valdevit |
| 2005/0108375 A1 | 5/2005 | Hallak-Stamler |
| 2005/0122979 A1 | 6/2005 | Gross |
| 2005/0152335 A1 | 7/2005 | Lodha |
| 2005/0157645 A1 | 7/2005 | Rabie et al. |
| 2005/0157751 A1 | 7/2005 | Rabie |
| 2005/0169188 A1 | 8/2005 | Cometto |
| 2005/0195813 A1 | 9/2005 | Ambe |
| 2005/0207423 A1 | 9/2005 | Herbst |
| 2005/0213561 A1 | 9/2005 | Yao |
| 2005/0220096 A1 | 10/2005 | Friskney |
| 2005/0259586 A1 | 11/2005 | Hafid |
| 2005/0265356 A1 | 12/2005 | Kawarai |
| 2005/0278565 A1 | 12/2005 | Frattura |
| 2006/0007869 A1 | 1/2006 | Hirota |
| 2006/0018302 A1 | 1/2006 | Ivaldi |
| 2006/0023707 A1* | 2/2006 | Makishima et al. .......... 370/389 |
| 2006/0029055 A1 | 2/2006 | Perera |
| 2006/0034292 A1 | 2/2006 | Wakayama |
| 2006/0036648 A1 | 2/2006 | Frey |
| 2006/0036765 A1 | 2/2006 | Weyman |
| 2006/0059163 A1 | 3/2006 | Frattura |
| 2006/0062187 A1 | 3/2006 | Rune |
| 2006/0072550 A1 | 4/2006 | Davis |
| 2006/0083172 A1 | 4/2006 | Jordan |
| 2006/0083254 A1 | 4/2006 | Ge |
| 2006/0093254 A1 | 5/2006 | Mozdy |
| 2006/0098589 A1 | 5/2006 | Kreeger |
| 2006/0126511 A1 | 6/2006 | Youn |
| 2006/0140130 A1 | 6/2006 | Kalkunte |
| 2006/0168109 A1 | 7/2006 | Warmenhoven |
| 2006/0184937 A1 | 8/2006 | Abels |
| 2006/0209886 A1 | 9/2006 | Silberman |
| 2006/0221960 A1 | 10/2006 | Borgione |
| 2006/0227776 A1 | 10/2006 | Chandrasekaran |
| 2006/0235995 A1 | 10/2006 | Bhatia |
| 2006/0242311 A1 | 10/2006 | Mai |
| 2006/0242398 A1 | 10/2006 | Fontijn |
| 2006/0245439 A1 | 11/2006 | Sajassi |
| 2006/0251067 A1 | 11/2006 | DeSanti |
| 2006/0256767 A1 | 11/2006 | Suzuki |
| 2006/0265515 A1 | 11/2006 | Shiga |
| 2006/0285499 A1 | 12/2006 | Tzeng |
| 2006/0291388 A1 | 12/2006 | Amdahl |
| 2006/0291480 A1 | 12/2006 | Cho |
| 2006/0294413 A1 | 12/2006 | Filz |
| 2007/0036178 A1 | 2/2007 | Hares |
| 2007/0053294 A1 | 3/2007 | Ho |
| 2007/0074052 A1 | 3/2007 | Hemmah |
| 2007/0081530 A1 | 4/2007 | Nomura |
| 2007/0083625 A1 | 4/2007 | Chamdani |
| 2007/0086362 A1 | 4/2007 | Kato |
| 2007/0094464 A1 | 4/2007 | Sharma |
| 2007/0097968 A1 | 5/2007 | Du |
| 2007/0098006 A1 | 5/2007 | Parry |
| 2007/0116224 A1 | 5/2007 | Burke |
| 2007/0116422 A1 | 5/2007 | Reynolds |
| 2007/0130295 A1 | 6/2007 | Rastogi |
| 2007/0156659 A1 | 7/2007 | Lim |
| 2007/0177525 A1 | 8/2007 | Wijnands |
| 2007/0177597 A1 | 8/2007 | Ju |
| 2007/0183313 A1 | 8/2007 | Narayanan |
| 2007/0206762 A1 | 9/2007 | Chandra |
| 2007/0211712 A1 | 9/2007 | Fitch |
| 2007/0220059 A1 | 9/2007 | Lu |
| 2007/0226214 A1 | 9/2007 | Smits |
| 2007/0238343 A1 | 10/2007 | Velleca |
| 2007/0258449 A1 | 11/2007 | Bennett |
| 2007/0274234 A1 | 11/2007 | Kubota |
| 2007/0280223 A1 | 12/2007 | Pan |
| 2007/0289017 A1 | 12/2007 | Copeland, III |
| 2008/0052487 A1 | 2/2008 | Akahane |
| 2008/0056135 A1 | 3/2008 | Lee |
| 2008/0057918 A1 | 3/2008 | Abrant |
| 2008/0065760 A1 | 3/2008 | Damm |
| 2008/0080517 A1 | 4/2008 | Roy |
| 2008/0095160 A1 | 4/2008 | Yadav |
| 2008/0101386 A1 | 5/2008 | Gray |
| 2008/0112133 A1 | 5/2008 | Torudbakken |
| 2008/0112400 A1 | 5/2008 | Dunbar et al. |
| 2008/0133760 A1 | 6/2008 | Berkvens |
| 2008/0159277 A1 | 7/2008 | Vobbilisetty |
| 2008/0172492 A1 | 7/2008 | Raghunath |
| 2008/0181196 A1 | 7/2008 | Regan |
| 2008/0181243 A1 | 7/2008 | Vobbilisetty |
| 2008/0186981 A1 | 8/2008 | Seto |
| 2008/0205377 A1 | 8/2008 | Chao |
| 2008/0219172 A1 | 9/2008 | Mohan |
| 2008/0225852 A1 | 9/2008 | Raszuk |
| 2008/0225853 A1 | 9/2008 | Melman |
| 2008/0228897 A1 | 9/2008 | Ko |
| 2008/0240129 A1 | 10/2008 | Elmeleegy |
| 2008/0267179 A1 | 10/2008 | LaVigne |
| 2008/0285458 A1 | 11/2008 | Lysne |
| 2008/0285555 A1 | 11/2008 | Ogasahara |
| 2008/0288020 A1 | 11/2008 | Einav |
| 2008/0298248 A1 | 12/2008 | Roeck |
| 2008/0304498 A1 | 12/2008 | Jorgensen |
| 2008/0310342 A1 | 12/2008 | Kruys |
| 2009/0022069 A1 | 1/2009 | Khan |
| 2009/0024734 A1 | 1/2009 | Merbach |
| 2009/0037607 A1 | 2/2009 | Farinacci |
| 2009/0042270 A1 | 2/2009 | Dolly |
| 2009/0044270 A1 | 2/2009 | Shelly |
| 2009/0067422 A1 | 3/2009 | Poppe |
| 2009/0067442 A1 | 3/2009 | Killian |
| 2009/0079560 A1 | 3/2009 | Fries |
| 2009/0080345 A1 | 3/2009 | Gray |
| 2009/0083445 A1 | 3/2009 | Ganga |
| 2009/0092042 A1 | 4/2009 | Yuhura |
| 2009/0092043 A1 | 4/2009 | Lapuh |
| 2009/0094354 A1 | 4/2009 | Rastogi |
| 2009/0106298 A1 | 4/2009 | Furusho |
| 2009/0106405 A1 | 4/2009 | Mazarick |
| 2009/0113408 A1 | 4/2009 | Toeroe |
| 2009/0116381 A1 | 5/2009 | Kanda |
| 2009/0122700 A1 | 5/2009 | Aboba |
| 2009/0129384 A1 | 5/2009 | Regan |
| 2009/0138577 A1 | 5/2009 | Casado |
| 2009/0138752 A1 | 5/2009 | Graham |
| 2009/0144720 A1 | 6/2009 | Roush |
| 2009/0161584 A1 | 6/2009 | Guan |

(56) References Cited

U.S. PATENT DOCUMENTS

| | | |
|---|---|---|
| 2009/0161670 A1 | 6/2009 | Shepherd |
| 2009/0168647 A1 | 7/2009 | Holness |
| 2009/0199177 A1 | 8/2009 | Edwards |
| 2009/0204965 A1 | 8/2009 | Tanaka |
| 2009/0213783 A1 | 8/2009 | Moreton |
| 2009/0222879 A1 | 9/2009 | Kostal |
| 2009/0232031 A1 | 9/2009 | Vasseur |
| 2009/0245112 A1 | 10/2009 | Okazaki |
| 2009/0245137 A1 | 10/2009 | Hares |
| 2009/0245242 A1 | 10/2009 | Carlson |
| 2009/0246137 A1 | 10/2009 | Hadida |
| 2009/0249444 A1 | 10/2009 | Macauley |
| 2009/0252049 A1 | 10/2009 | Ludwig |
| 2009/0252061 A1 | 10/2009 | Small |
| 2009/0252503 A1 | 10/2009 | Ishigami |
| 2009/0260083 A1 | 10/2009 | Szeto |
| 2009/0279558 A1 | 11/2009 | Davis |
| 2009/0292858 A1 | 11/2009 | Lambeth |
| 2009/0316721 A1 | 12/2009 | Kanda |
| 2009/0323698 A1 | 12/2009 | LeFaucheur |
| 2009/0323708 A1 | 12/2009 | Ihle |
| 2009/0327392 A1 | 12/2009 | Tripathi |
| 2009/0327462 A1 | 12/2009 | Adams |
| 2009/0328392 | 12/2009 | Tripathi |
| 2010/0002382 A1 | 1/2010 | Aybay |
| 2010/0027420 A1 | 2/2010 | Smith |
| 2010/0042869 A1 | 2/2010 | Szabo |
| 2010/0046471 A1 | 2/2010 | Hattori |
| 2010/0054260 A1 | 3/2010 | Pandey |
| 2010/0061269 A1 | 3/2010 | Banerjee |
| 2010/0074175 A1 | 3/2010 | Banks |
| 2010/0097941 A1 | 4/2010 | Carlson |
| 2010/0103813 A1 | 4/2010 | Allan |
| 2010/0103939 A1 | 4/2010 | Carlson |
| 2010/0114818 A1 | 5/2010 | Lier |
| 2010/0131636 A1 | 5/2010 | Suri |
| 2010/0157844 A1 | 6/2010 | Casey |
| 2010/0158024 A1 | 6/2010 | Sajassi |
| 2010/0165877 A1 | 7/2010 | Shukla |
| 2010/0165995 A1 | 7/2010 | Mehta |
| 2010/0168467 A1 | 7/2010 | Johnston |
| 2010/0169467 A1 | 7/2010 | Shukla |
| 2010/0169948 A1 | 7/2010 | Budko |
| 2010/0182920 A1 | 7/2010 | Matsuoka |
| 2010/0189119 A1 | 7/2010 | Sawada |
| 2010/0195489 A1 | 8/2010 | Zhou |
| 2010/0215042 A1 | 8/2010 | Sato |
| 2010/0215049 A1 | 8/2010 | Raza |
| 2010/0220724 A1 | 9/2010 | Rabie |
| 2010/0226368 A1 | 9/2010 | Mack-Crane |
| 2010/0226381 A1 | 9/2010 | Mehta |
| 2010/0246388 A1 | 9/2010 | Gupta |
| 2010/0254703 A1 | 10/2010 | Kirkpatrick |
| 2010/0257263 A1 | 10/2010 | Casado |
| 2010/0265849 A1 | 10/2010 | Harel |
| 2010/0271960 A1 | 10/2010 | Krygowski |
| 2010/0272107 A1 | 10/2010 | Papp |
| 2010/0281106 A1 | 11/2010 | Ashwood-Smith |
| 2010/0284414 A1 | 11/2010 | Agarwal |
| 2010/0284418 A1 | 11/2010 | Gray |
| 2010/0284698 A1 | 11/2010 | McColloch |
| 2010/0287262 A1 | 11/2010 | Elzur |
| 2010/0287548 A1 | 11/2010 | Zhou |
| 2010/0290464 A1 | 11/2010 | Assarpour |
| 2010/0290473 A1 | 11/2010 | Enduri |
| 2010/0299527 A1 | 11/2010 | Arunan |
| 2010/0303071 A1 | 12/2010 | Kotalwar |
| 2010/0303075 A1 | 12/2010 | Tripathi |
| 2010/0303083 A1 | 12/2010 | Belanger |
| 2010/0309820 A1 | 12/2010 | Rajagopalan |
| 2010/0309912 A1 | 12/2010 | Mehta |
| 2010/0329110 A1 | 12/2010 | Rose |
| 2011/0007738 A1 | 1/2011 | Berman |
| 2011/0019678 A1 | 1/2011 | Mehta |
| 2011/0032945 A1 | 2/2011 | Mullooly |
| 2011/0035489 A1 | 2/2011 | McDaniel |
| 2011/0035498 A1 | 2/2011 | Shah |
| 2011/0044339 A1 | 2/2011 | Kotalwar |
| 2011/0044352 A1 | 2/2011 | Chaitou |
| 2011/0051723 A1 | 3/2011 | Rabie |
| 2011/0058547 A1 | 3/2011 | Waldrop |
| 2011/0064086 A1 | 3/2011 | Xiong |
| 2011/0064089 A1 | 3/2011 | Hidaka |
| 2011/0072208 A1 | 3/2011 | Gulati |
| 2011/0085560 A1 | 4/2011 | Chawla |
| 2011/0085563 A1 | 4/2011 | Kotha |
| 2011/0088011 A1 | 4/2011 | Ouali |
| 2011/0110266 A1 | 5/2011 | Li |
| 2011/0134802 A1* | 6/2011 | Rajagopalan et al. ........ 370/256 |
| 2011/0134803 A1 | 6/2011 | Dalvi |
| 2011/0134925 A1 | 6/2011 | Safrai |
| 2011/0142053 A1 | 6/2011 | Merwe |
| 2011/0142062 A1 | 6/2011 | Wang |
| 2011/0149526 A1 | 6/2011 | Turner |
| 2011/0158113 A1 | 6/2011 | Nanda |
| 2011/0161494 A1 | 6/2011 | McDysan |
| 2011/0161695 A1 | 6/2011 | Okita |
| 2011/0176412 A1 | 7/2011 | Stine |
| 2011/0188373 A1 | 8/2011 | Saito |
| 2011/0194403 A1 | 8/2011 | Sajassi |
| 2011/0194563 A1 | 8/2011 | Shen |
| 2011/0228767 A1 | 9/2011 | Singla |
| 2011/0228780 A1 | 9/2011 | Ashwood-Smith |
| 2011/0231570 A1 | 9/2011 | Altekar |
| 2011/0231574 A1 | 9/2011 | Saunderson |
| 2011/0235523 A1* | 9/2011 | Jha .......................... H04L 45/66 370/242 |
| 2011/0243133 A9 | 10/2011 | Villait |
| 2011/0243136 A1 | 10/2011 | Raman |
| 2011/0246669 A1 | 10/2011 | Kanada |
| 2011/0255538 A1 | 10/2011 | Srinivasan |
| 2011/0255540 A1* | 10/2011 | Mizrahi et al. .............. 370/392 |
| 2011/0261828 A1 | 10/2011 | Smith |
| 2011/0268118 A1 | 11/2011 | Schlansker |
| 2011/0268120 A1 | 11/2011 | Vobbilisetty |
| 2011/0268125 A1 | 11/2011 | Vobbilisetty |
| 2011/0273988 A1 | 11/2011 | Tourrilhes |
| 2011/0273990 A1 | 11/2011 | Rajagopalan |
| 2011/0274114 A1 | 11/2011 | Dhar |
| 2011/0280572 A1 | 11/2011 | Vobbilisetty |
| 2011/0286357 A1 | 11/2011 | Haris |
| 2011/0286457 A1 | 11/2011 | Ee |
| 2011/0286462 A1 | 11/2011 | Kompella |
| 2011/0292947 A1 | 12/2011 | Vobbilisetty |
| 2011/0296052 A1 | 12/2011 | Guo |
| 2011/0299391 A1 | 12/2011 | Vobbilisetty |
| 2011/0299413 A1 | 12/2011 | Chatwani |
| 2011/0299414 A1 | 12/2011 | Yu |
| 2011/0299527 A1 | 12/2011 | Yu |
| 2011/0299528 A1 | 12/2011 | Yu |
| 2011/0299531 A1 | 12/2011 | Yu |
| 2011/0299532 A1 | 12/2011 | Yu |
| 2011/0299533 A1 | 12/2011 | Yu |
| 2011/0299534 A1 | 12/2011 | Koganti |
| 2011/0299535 A1 | 12/2011 | Vobbilisetty |
| 2011/0299536 A1 | 12/2011 | Cheng |
| 2011/0317559 A1 | 12/2011 | Kern |
| 2011/0317703 A1 | 12/2011 | Dunbar et al. |
| 2012/0011240 A1 | 1/2012 | Hara |
| 2012/0014261 A1 | 1/2012 | Salam |
| 2012/0014387 A1 | 1/2012 | Dunbar |
| 2012/0020220 A1 | 1/2012 | Sugita |
| 2012/0027017 A1 | 2/2012 | Rai |
| 2012/0033663 A1 | 2/2012 | Guichard |
| 2012/0033665 A1 | 2/2012 | Da Silva |
| 2012/0033668 A1 | 2/2012 | Humphries |
| 2012/0033669 A1 | 2/2012 | Mohandas |
| 2012/0033672 A1 | 2/2012 | Page |
| 2012/0042095 A1 | 2/2012 | Kotha |
| 2012/0063363 A1 | 3/2012 | Li |
| 2012/0075991 A1 | 3/2012 | Sugita |
| 2012/0099567 A1 | 4/2012 | Hart |
| 2012/0099602 A1 | 4/2012 | Nagapudi |
| 2012/0099863 A1 | 4/2012 | Xu |

(56) References Cited

U.S. PATENT DOCUMENTS

| | | |
|---|---|---|
| 2012/0102160 A1 | 4/2012 | Breh |
| 2012/0106339 A1 | 5/2012 | Mishra |
| 2012/0117438 A1 | 5/2012 | Shaffer |
| 2012/0131097 A1 | 5/2012 | Baykal |
| 2012/0131289 A1 | 5/2012 | Taguchi |
| 2012/0134266 A1 | 5/2012 | Roitshtein |
| 2012/0136999 A1 | 5/2012 | Roitshtein |
| 2012/0147740 A1 | 6/2012 | Nakash |
| 2012/0158997 A1 | 6/2012 | Hsu |
| 2012/0163164 A1 | 6/2012 | Terry |
| 2012/0170491 A1 | 7/2012 | Kern |
| 2012/0177039 A1* | 7/2012 | Berman .......... 370/390 |
| 2012/0210416 A1 | 8/2012 | Mihelich |
| 2012/0221636 A1 | 8/2012 | Surtani |
| 2012/0230225 A1 | 9/2012 | Matthews |
| 2012/0239918 A1 | 9/2012 | Huang |
| 2012/0243539 A1 | 9/2012 | Keesara |
| 2012/0250502 A1 | 10/2012 | Brolin |
| 2012/0260079 A1 | 10/2012 | Mruthyunjaya |
| 2012/0275297 A1 | 11/2012 | Subramanian |
| 2012/0275347 A1 | 11/2012 | Banerjee |
| 2012/0278804 A1 | 11/2012 | Narayanasamy |
| 2012/0287785 A1 | 11/2012 | Kamble |
| 2012/0294192 A1 | 11/2012 | Masood |
| 2012/0294194 A1 | 11/2012 | Balasubramanian |
| 2012/0320800 A1 | 12/2012 | Kamble |
| 2012/0320926 A1* | 12/2012 | Kamath et al. .......... 370/401 |
| 2012/0327766 A1 | 12/2012 | Tsai |
| 2012/0327937 A1* | 12/2012 | Melman et al. .......... 370/392 |
| 2013/0003535 A1 | 1/2013 | Sarwar |
| 2013/0003549 A1 | 1/2013 | Matthews |
| 2013/0003737 A1 | 1/2013 | Sinicrope |
| 2013/0003738 A1* | 1/2013 | Koganti et al. .......... 370/392 |
| 2013/0028072 A1 | 1/2013 | Addanki |
| 2013/0034015 A1 | 2/2013 | Jaiswal |
| 2013/0034021 A1 | 2/2013 | Jaiswal |
| 2013/0066947 A1 | 3/2013 | Ahmad |
| 2013/0067466 A1 | 3/2013 | Combs |
| 2013/0070762 A1 | 3/2013 | Adams |
| 2013/0083693 A1 | 4/2013 | Himura |
| 2013/0097345 A1 | 4/2013 | Munoz |
| 2013/0114595 A1 | 5/2013 | Mack-Crane |
| 2013/0124707 A1 | 5/2013 | Ananthapadmanabha |
| 2013/0127848 A1 | 5/2013 | Joshi |
| 2013/0132296 A1 | 5/2013 | Koppenhagen |
| 2013/0135811 A1 | 5/2013 | Dunwoody |
| 2013/0136123 A1 | 5/2013 | Ge |
| 2013/0148546 A1 | 6/2013 | Eisenhauer |
| 2013/0156425 A1 | 6/2013 | Kirkpatrick |
| 2013/0194914 A1 | 8/2013 | Agarwal |
| 2013/0219473 A1 | 8/2013 | Schaefer |
| 2013/0223221 A1 | 8/2013 | Xu |
| 2013/0223449 A1 | 8/2013 | Koganti |
| 2013/0250951 A1 | 9/2013 | Koganti |
| 2013/0259037 A1 | 10/2013 | Natarajan |
| 2013/0266015 A1 | 10/2013 | Qu |
| 2013/0268590 A1 | 10/2013 | Mahadevan |
| 2013/0272135 A1 | 10/2013 | Leong |
| 2013/0294451 A1 | 11/2013 | Li |
| 2013/0297757 A1 | 11/2013 | Han |
| 2013/0301425 A1 | 11/2013 | Udutha |
| 2013/0301642 A1 | 11/2013 | Radhakrishnan |
| 2013/0308492 A1 | 11/2013 | Baphna |
| 2013/0308647 A1 | 11/2013 | Rosset |
| 2013/0315586 A1 | 11/2013 | Kipp |
| 2013/0322427 A1 | 12/2013 | Stiekes |
| 2013/0332660 A1 | 12/2013 | Talagala |
| 2013/0336104 A1 | 12/2013 | Talla |
| 2013/0346583 A1 | 12/2013 | Low |
| 2014/0013324 A1 | 1/2014 | Zhang |
| 2014/0019608 A1 | 1/2014 | Kawakami |
| 2014/0025736 A1 | 1/2014 | Wang |
| 2014/0044126 A1 | 2/2014 | Sabhanatarajan |
| 2014/0050223 A1 | 2/2014 | Foo |
| 2014/0056298 A1 | 2/2014 | Vobbilisetty |
| 2014/0059225 A1 | 2/2014 | Gasparakis |
| 2014/0064056 A1 | 3/2014 | Sakata |
| 2014/0071987 A1* | 3/2014 | Janardhanan .......... H04L 45/66 370/390 |
| 2014/0086253 A1 | 3/2014 | Yong |
| 2014/0105034 A1 | 4/2014 | Sun |
| 2014/0157251 A1 | 6/2014 | Hocker |
| 2014/0258446 A1 | 9/2014 | Bursell |
| 2014/0269733 A1 | 9/2014 | Venkatesh |
| 2014/0298091 A1 | 10/2014 | Carlen |
| 2014/0355477 A1 | 12/2014 | Velayudhan et al. |
| 2015/0010007 A1 | 1/2015 | Matsuhira |
| 2015/0030031 A1 | 1/2015 | Zhou |
| 2015/0127618 A1 | 5/2015 | Alberti |
| 2015/0143369 A1 | 5/2015 | Zheng |
| 2015/0172098 A1 | 6/2015 | Agarwal |
| 2015/0195093 A1 | 7/2015 | Mahadevan et al. |
| 2015/0222506 A1 | 8/2015 | Kizhakkiniyil |
| 2015/0248298 A1 | 9/2015 | Gavrilov |
| 2015/0263991 A1 | 9/2015 | MacChiano |
| 2015/0281066 A1 | 10/2015 | Koley |
| 2015/0301901 A1 | 10/2015 | Rath |
| 2015/0347468 A1 | 12/2015 | Bester |
| 2016/0072899 A1 | 3/2016 | Tung |

FOREIGN PATENT DOCUMENTS

| | | |
|---|---|---|
| EP | 0579567 A2 | 1/1994 |
| EP | 0993156 A2 | 12/2000 |
| EP | 1398920 A2 | 3/2004 |
| EP | 1916807 A2 | 4/2008 |
| EP | 2001167 A1 | 12/2008 |
| EP | 2874359 | 5/2015 |
| WO | 2008056838 | 5/2008 |
| WO | 2009042919 | 4/2009 |
| WO | 2010111142 A1 | 9/2010 |
| WO | 2011140028 A1 | 11/2011 |
| WO | 2014031781 | 2/2014 |

OTHER PUBLICATIONS

Knight, S. et al. "Virtual Router Redundancy Protocol", Apr. 1998, XP-002135272.

Eastlake, Donald et al., "RBridges: TRILL Header Options", Dec. 2009.

Touch, J. et al., "Transparent Interconnection of Lots of Links (TRILL): Problem and Applicability Statement", May 2009.

Perlman, Radia et al., "RBridge VLAN Mapping", Dec. 2009.

"Brocade Fabric OS (FOS) 6.2 Virtual Fabrics Feature Frequently Asked Questions".

Perlman, Radia "Challenges and Opportunities in the Design of TRILL: a Routed layer 2 Technology", XP-002649647, 2009.

Nadas, S. et al., "Virtual Router Redundancy Protocol (VRRP) Version 3 for IPv4 and IPv6", Mar. 2010.

Perlman, Radia et al., "RBridges: Base Protocol Specification", Mar. 2010.

Christensen, M. et al., "Considerations for Internet Group Management Protocol (IGMP) and Multicast Listener Discovery (MLD) Snooping Switches", May 2006.

"Switched Virtual Internetworking moved beyond bridges and routers", 8178 Data Communications Sep. 23, 1994, No. 12, New York.

S. Night et al., "Virtual Router Redundancy Protocol", Network Working Group, XP-002135272, Apr. 1998.

Eastlake 3rd., Donald et al., "RBridges: TRILL Header Options", Draft-ietf-trill-rbridge-options-00.txt, Dec. 24, 2009.

J. Touch, et al., "Transparent Interconnection of Lots of Links (TRILL): Problem and Applicability Statement", May 2009.

Perlman, Radia et al., "RBridge VLAN Mapping", Draft-ietf-trill-rbridge-vlan-mapping-01.txt, Dec. 4, 2009.

Brocade Fabric OS (FOS) 6.2 Virtual Fabrics Feature Frequently Asked Questions.

Perlman, Radia et al., "RBridges: Base Protocol Specification", draft-ietf-trill-rbridge-protocol-16.txt, Mar. 3, 2010.

Lapuh, Roger et al., "Split Multi-link Trunking (SMLT)", Oct. 2002.

(56) References Cited

OTHER PUBLICATIONS

Lapuh, Roger et al., "Split Multi-link Trunking (SMLT) draft-lapuh-network-smlt-08", 2008.
Office Action for U.S. Appl. No. 13/533,843, filed Jun. 26, 2012, dated Oct. 21, 2013.
Office Action for U.S. Appl. No. 13/312,903, filed Dec. 6, 2011, dated Nov. 12, 2013.
Office Action for U.S. Appl. No. 13/092,873, filed Apr. 22, 2011, dated Nov. 29, 2013.
Office Action for U.S. Appl. No. 13/194,526, filed Jul. 16, 2011, dated Dec. 2, 2013.
Office Action for U.S. Appl. No. 13/092,460, filed Apr. 22, 2011, dated Mar. 14, 2014.
Office Action for U.S. Appl. No. 13/042,259, filed Mar. 7, 2011, dated Jan. 16, 2014.
Office Action for U.S. Appl. No. 13/092,580, filed Apr. 22, 2011, dated Jan. 10, 2014.
Office Action for U.S. Appl. No. 13/092,877, filed Apr. 22, 2011, dated Jan. 6, 2014.
Office Action for U.S. Appl. No. 13/598,204, filed Aug. 29, 2012, dated Feb. 20, 2014.
Office Action for U.S. Appl. No. 13/092,701, filed Apr. 22, 2011, dated Mar. 26, 2014.
Office Action for U.S. Appl. No. 13/092,724, filed Apr. 22, 2011, dated Apr. 9, 2014.
Office Action for U.S. Appl. No. 13/098,490, filed May 2, 2011, dated Mar. 27, 2014.
Louati, Wajdi et al., "Network-Based Virtual Personal Overlay Networks Using Programmable Virtual Routers", 2005.
Knight, Paul et al., "Network based IP VPN Architecture using Virtual Routers", May 2003.
Kreeger, L. et al. "Network Virtualization Overlay Control Protocol Requirements draft-kreeger-nvo3-overlay-cp-00", Aug. 2, 2012.
An Introduction to Brocade VCS Fabric Technology, Dec. 3, 2012.
Knight, Paul et al. "Layer 2 and 3 Virtual Private Networks: Taxonomy, Technology, and Standardization Efforts", 2004.
Narten, T. et al. "Problem Statement: Overlays for Network Virtualization draft-narten-nvo3-overlay-problem-statement-01", Oct. 31, 2011.
The Effortless Network: HyperEdge Technology for the Campus LAN, 2012.
FastIron and TurbuIron 24x Configuration Guide, 2010.
FastIron Configuration Guide, Supporting IronWare Software Release 07.0.00, 2009.
Foundary FastIron Configuration Guide, Software Release FSX 04.2.00b, Software Release FWS 04.3.00, Software Release FGS 05.0.00a, 2008.
Brocade Unveils "The Effortless Network", 2009.
Office Action for U.S. Appl. No. 12/725,249, filed Mar. 16, 2010, dated Sep. 12, 2012.
Office Action for U.S. Appl. No. 12/725,249, filed Mar. 16, 2010, dated Apr. 26, 2013.
Office Action for U.S. Appl. No. 13/087,239, filed Apr. 14, 2011, dated May 22, 2013.
Office Action for U.S. Appl. No. 13/098,490, filed May 2, 2011, dated Dec. 21, 2012.
Office Action for U.S. Appl. No. 13/098,490, filed May 2, 2011, dated Jul. 9, 2013.
Office Action for U.S. Appl. No. 13/092,724, filed Apr. 22, 2011, dated Feb. 5, 2013.
Office Action for U.S. Appl. No. 13/092,724, filed Apr. 22, 2011, dated Jul. 16, 2013.
Office Action for U.S. Appl. No. 13/092,580, filed Apr. 22, 2011, dated Jun. 10, 2013.
Office Action for U.S. Appl. No. 13/042,259, filed Mar. 7, 2011, dated Mar. 18, 2013.
Office Action for U.S. Appl. No. 13/092,460, filed Apr. 22, 2011, dated Jun. 21, 2013.
Office Action for U.S. Appl. No. 13/042,259, filed Mar. 7, 2011, dated Jul. 31, 2013.
Office Action for U.S. Appl. No. 13/092,701, filed Apr. 22, 2011, dated Jan. 28, 2013.
Office Action for U.S. Appl. No. 13/092,701, filed Apr. 22, 2011, dated Jul. 3, 2013.
Office Action for U.S. Appl. No. 13/092,752, filed Apr. 22, 2011, dated Feb. 5, 2013.
Office Action for U.S. Appl. No. 13/092,752, filed Apr. 22, 2011, dated Jul. 18, 2013.
Office Action for U.S. Appl. No. 12/950,974, filed Nov. 19, 2010, dated Dec. 20, 2012.
Office Action for U.S. Appl. No. 12/950,974, filed Nov. 19, 2010, dated May 24, 2012.
Office Action for U.S. Appl. No. 13/092,877, filed Apr. 22, 2011, dated Mar. 4, 2013.
Office Action for U.S. Appl. No. 13/092,877, filed Apr. 22, 2011, dated Sep. 5, 2013.
Office Action for U.S. Appl. No. 12/950,968, filed Nov. 19, 2010, dated Jun. 7, 2012.
Office Action for U.S. Appl. No. 12/950,968, filed Nov. 19, 2010, dated Jan. 4, 2013.
Office Action for U.S. Appl. No. 13/092,864, filed Apr. 22, 2011, dated Sep. 19, 2012.
Office Action for U.S. Appl. No. 13/098,360, filed Apr. 29, 2011, dated May 31, 2013.
Office Action for U.S. Appl. No. 13/044,326, filed Mar. 9, 2011, dated Oct. 2, 2013.
Office Action for U.S. Appl. No., 13/030,806, filed Feb. 18, 2011, dated Dec. 3, 2012.
Office Action for U.S. Appl. No. 13/030,806, filed Feb. 18, 2011, dated Jun. 11, 2013.
Office Action for U.S. Appl. No. 13/030,688, filed Feb. 18, 2011, dated Apr. 25, 2013.
Office Action for U.S. Appl. No. 13/044,301, filed Mar. 9, 2011, dated Jun. 11, 2013.
Office Action for U.S. Appl. No. 13/044,301, filed Mar. 9, 2011, dated Feb. 22, 2013.
Office Action for U.S. Appl. No. 13/050,102, filed Mar. 17, 2011, dated Oct. 26, 2012.
Office Action for U.S. Appl. No. 13/050,102, filed Mar. 17, 2011, dated May 16, 2013.
Office Action for U.S. Appl. No., 13/184,526, filed Jul. 16, 2011, dated Jan. 28, 2013.
Office Action for U.S. Appl. No. 13/184,526, filed May 22, 2013, dated May 22, 2013.
Office Action for U.S. Appl. No. 13/092,873, filed Apr. 22, 2011, dated Jun. 19, 2013.
Office Action for U.S. Appl. No. 13/365,808, filed Feb. 3, 2012, dated Jul. 18, 2013.
Office Action for U.S. Appl. No. 13/312,903, filed Dec. 6, 2011, dated Jun. 13, 2013.
Zhai F. Hu et al. "RBridge: Pseudo-Nickname; draft-hu-trill-pseudonode-nickname-02.txt", May 15, 2012.
Huang, Nen-Fu et al., "An Effective Spanning Tree Algorithm for a Bridged LAN", Mar. 16, 1992.
Office Action dated Jun. 6, 2014, U.S. Appl. No. 13/669,357, filed Nov. 5, 2012.
Office Action dated Feb. 20, 2014, U.S. Appl. No. 13/598,204, filed Aug. 29, 2012.
Office Action dated May 14, 2014, U.S. Appl. No. 13/533,843, filed Jun. 26, 2012.
Office Action dated May 9, 2014, U.S. Appl. No. 13/484,072, filed May 30, 2012.
Office Action dated Feb. 28, 2014, U.S. Appl. No. 13/351,513, filed Jan. 17, 2012.
Office Action dated Jun. 18, 2014, U.S. Appl. No. 13/440,861, filed Apr. 5, 2012.
Office Action dated Mar. 6, 2014, U.S. Appl. No. 13/425,238, filed Mar. 20, 2012.
Office Action dated Jun. 20, 2014, U.S. Appl. No. 13/092,877, filed Apr. 22, 2011.
Office Action dated Apr. 9, 2014, U.S. Appl. No. 13/092,752, filed Apr. 22, 2011.

(56) References Cited

OTHER PUBLICATIONS

Lapuh, Roger et al., 'Split Multi-link Trunking (SMLT) draft-lapuh-network-smlt-08', Jan. 2009.
'An Introduction to Brocade VCS Fabric Technology', BROCADE white paper, http://community.brocade.com/docs/DOC-2954, Dec. 3, 2012.
U.S. Appl. No. 13/030,806 Office Action dated Dec. 3, 2012.
Office action dated Jan. 10, 2014, U.S. Appl. No. 13/092,580, filed Apr. 22, 2011.
Office action dated Jan. 16, 2014, U.S. Appl. No. 13/042,259, filed Mar. 7, 2011.
Office action dated Jul. 31, 2013, U.S. Appl. No. 13/042,259, filed Mar. 7, 2011.
Office action dated Jan. 6, 2014, U.S. Appl. No. 13/092,877, filed Apr. 22, 2011.
Office action dated Oct. 2, 2013, U.S. Appl. No. 13/044,326, filed Mar. 9, 2011.
Office action dated Dec. 2, 2013, U.S. Appl. No. 13/184,526, filed Jul. 16, 2011.
Office action dated Nov. 29, 2013, U.S. Appl. No. 13/092,873, filed Apr. 22, 2011.
Office action dated Nov. 12, 2013, U.S. Appl. No. 13/312,903, filed Dec. 6, 2011.
BROCADE Brocade Unveils The Effortless Network, http://newsroom.brocade.com/press-releases/brocade-unveils-the-effortless-network-nasdaq-brcd-0859535, 2012.
Kreeger, L. et al., 'Network Virtualization Overlay Control Protocol Requirements draft-kreeger-nvo3-overlay-cp-00', Jan. 30, 2012.
Office Action for U.S. Appl. No. 13/365,993, filed Feb. 3, 2012, dated Jul. 23, 2013.
Office Action for U.S. Appl. No. 13/365,808, filed Jul. 18, 2013, dated Jul. 18, 2013.
Office Action for U.S. Appl. No. 13/092,887 dated Jan. 6, 2014.
Office action dated Apr. 26, 2012, U.S. Appl. No. 12/725,249, filed Mar. 16, 2010.
Office action dated Sep. 12, 2012, U.S. Appl. No. 12/725,249, filed Mar. 16, 2010.
Office action dated Dec. 21, 2012, U.S. Appl. No. 13/098,490, filed May 2, 2011.
Office action dated Mar. 27, 2014, U.S. Appl. No. 13/098,490, filed May 2, 2011.
Office action dated Jul. 9, 2013, U.S. Appl. No. 13/098,490, filed May 2, 2011.
Office action dated May 22, 2013, U.S. Appl. No. 13/087,239, filed Apr. 14, 2011.
Office action dated Dec. 5, 2012, U.S. Appl. No. 13/087,239, filed Apr. 14, 2011.
Office action dated Apr. 9, 2014, U.S. Appl. No. 13/092,724, filed Apr. 22, 2011.
Office action dated Feb. 5, 2013, U.S. Appl. No. 13/092,724, filed Apr. 22, 2011.
Office action dated Jun. 10, 2013, U.S. Appl. No. 13/092,580, filed Apr. 22, 2011.
Office action dated Mar. 18, 2013, U.S. Appl. No. 13/042,259, filed Mar. 7, 2011.
Office action dated Mar. 14, 2014, U.S. Appl. No. 13/092,460, filed Apr. 22, 2011.
Office action dated Jun. 21, 2013, U.S. Appl. No. 13/092,460, filed Apr. 22, 2011.
Office action dated Jan. 28, 2013, U.S. Appl. No. 13/092,701, filed Apr. 22, 2011.
Office action dated Mar. 26, 2014, U.S. Appl. No. 13/092,701, filed Apr. 22, 2011.
Office action dated Jul. 3, 2013, U.S. Appl. No. 13/092,701, filed Apr. 22, 2011.
Office action dated Jul. 18, 2013, U.S. Appl. No. 13/092,752, filed Apr. 22, 2011.
Office action dated Dec. 20, 2012, U.S. Appl. No. 12/950,974, filed Nov. 19, 2010.
Office action dated May 24, 2012, U.S. Appl. No. 12/950,974, filed Nov. 19, 2010.
Office action dated Sep. 5, 2013, U.S. Appl. No. 13/092,877, filed Apr. 22, 2011.
Office action dated Mar. 4, 2013, U.S. Appl. No. 13/092,877, filed Apr. 22, 2011.
Office action dated Jan. 4, 2013, U.S. Appl. No. 12/950,968, filed Nov. 19, 2010.
Office action dated Jun. 7, 2012, U.S. Appl. No. 12/950,968, filed Nov. 19, 2010.
Office action dated Sep. 19, 2012, U.S. Appl. No. 13/092,864, filed Apr. 22, 2011.
Office action dated May 31, 2013, U.S. Appl. No. 13/098,360, filed Apr. 29, 2011.
Office action dated Dec. 3, 2012, U.S. Appl. No. 13/030,806, filed Feb. 18, 2011.
Office action dated Apr. 22, 2014, U.S. Appl. No. 13/030,806, filed Feb. 18, 2011.
Office action dated Jun. 11, 2013, U.S. Appl. No. 13/030,806, filed Feb. 18, 2011.
Office action dated Apr. 25, 2013, U.S. Appl. No. 13/030,688, filed Feb. 18, 2011.
Office action dated Feb. 22, 2013, U.S. Appl. No. 13/044,301, filed Mar. 9, 2011.
Office action dated Jun. 11, 2013, U.S. Appl. No. 13/044,301, filed Mar. 9, 2011.
Office action dated Oct. 26, 2012, U.S. Appl. No. 13/050,102, filed Mar. 17, 2011.
Office action dated May 16, 2013, U.S. Appl. No. 13/050,102, filed Mar. 17, 2011.
Office action dated Aug. 4, 2014, U.S. Appl. No. 13/050,102, filed Mar. 17, 2011.
Office action dated Jan. 28, 2013, U.S. Appl. No. 13/148,526, filed Jul. 16, 2011.
Office action dated May 22, 2013, U.S. Appl. No. 13/148,526, filed Jul. 16, 2011.
Office action dated Jun. 19, 2013, U.S. Appl. No. 13/092,873, filed Apr. 22, 2011.
Office action dated Jul. 18, 2013, U.S. Appl. No. 13/365,808, filed Feb. 3, 2012.
Office action dated Jun. 13, 2013, U.S. Appl. No. 13/312,903, filed Dec. 6, 2011.
Office Action for U.S. Appl. No. 13/030,688, filed Feb. 18, 2011, dated Jul. 17, 2014.
Office Action for U.S. Appl. No. 13/044,326, filed Mar. 9, 2011, dated Jul. 7, 2014.
Office Action for U.S. Appl. No. 13/092,752, filed Apr. 22, 2011, dated Apr. 9, 2014.
Office Action for U.S. Appl. No. 13/092,873, filed Apr. 22, 2011, dated Jul. 25, 2014.
Office Action for U.S. Appl. No. 13/092,877, filed Apr. 22, 2011, dated Jun. 20, 2014.
Office Action for U.S. Appl. No. 13/312,903, filed Dec. 6, 2011, dated Aug. 7, 2014.
Office Action for U.S. Appl. No. 13/351,513, filed Jan. 17, 2012, dated Jul. 24, 2014.
Office Action for U.S. Appl. No. 13/425,238, filed Mar. 20, 2012, dated Mar. 6, 2014.
Office Action for U.S. Appl. No. 13/556,061, filed Jul. 23, 2012, dated Jun. 6, 2014.
Office Action for U.S. Appl. No. 13/742,207 dated Jul. 24, 2014, filed Jan. 15, 2013.
Office Action for U.S. Appl. No. 13/950,974, filed Nov. 19, 2010, dated Dec. 2, 2012.
Office Action for U.S. Appl. No. 13/087,239, filed Apr. 14, 2011, dated Dec. 5, 2012.
Office Action for U.S. Appl. No. 13/351,513, filed Jan. 17, 2012, dated Feb. 28, 2014.
Perlman R: 'Challenges and opportunities in the design of TRILL: a routed layer 2 technology', 2009 IEEE GLOBECOM Workshops, Honolulu, HI, USA, Piscataway, NJ, USA, Nov. 30, 2009, pp. 1-6, XP002649647, DOI: 10.1109/GLOBECOM.2009.5360776 ISBN: 1-4244-5626-0 [retrieved on Jul. 19, 2011].

(56) References Cited

OTHER PUBLICATIONS

TRILL Working Group Internet-Draft Intended status: Proposed Standard RBridges: Base Protocol Specificaiton Mar. 3, 2010.
Office action dated Aug. 14, 2014, U.S. Appl. No. 13/092,460, filed Apr. 22, 2011.
Office action dated Jul. 7, 2014, for U.S. Appl. No. 13/044,326, filed Mar. 9, 2011.
Office Action dated Dec. 19, 2014, for U.S. Appl. No. 13/044,326, filed Mar. 9, 2011.
Office Action for U.S. Appl. No. 13/092,873, filed Apr. 22, 2011, dated Nov. 7, 2014.
Office Action for U.S. Appl. No. 13/092,877, filed Apr. 22, 2011, dated Nov. 10, 2014.
Office Action for U.S. Appl. No. 13/157,942, filed Jun. 10, 2011.
Mckeown, Nick et al. "OpenFlow: Enabling Innovation in Campus Networks", Mar. 14, 2008, www.openflow.org/documents/openflow-wp-latest.pdf.
Office Action for U.S. Appl. No. 13/044,301, dated Mar. 9, 2011.
Office Action for U.S. Appl. No. 13/184,526, filed Jul. 16, 2011, dated Jan. 5, 2015.
Office Action for U.S. Appl. No. 13/598,204, filed Aug. 29, 2012, dated Jan. 5, 2015.
Office Action for U.S. Appl. No. 13/669,357, filed Nov. 5, 2012, dated Jan. 30, 2015.
Office Action for U.S. Appl. No. 13/851,026, filed Mar. 26, 2013, dated Jan. 30, 2015.
Office Action for U.S. Appl. No. 13/786,328, filed Mar. 5, 2013, dated Mar. 13, 2015.
Office Action for U.S. Appl. No. 13/092,460, filed Apr. 22, 2011, dated Mar. 13, 2015.
Office Action for U.S. Appl. No. 13/425,238, dated Mar. 12, 2015.
Office Action for U.S. Appl. No. 13/092,752, filed Apr. 22, 2011, dated Feb. 27, 2015.
Office Action for U.S. Appl. No. 13/042,259, filed Mar. 7, 2011, dated Feb. 23, 2015.
Office Action for U.S. Appl. No. 13/044,301, filed Mar. 9, 2011, dated Jan. 29, 2015.
Office Action for U.S. Appl. No. 13/050,102, filed Mar. 17, 2011, dated Jan. 26, 2015.
Office action dated Oct. 2, 2014, for U.S. Appl. No. 13/092,752, filed Apr. 22, 2011.
Kompella, Ed K. et al., 'Virtual Private LAN Service (VPLS) Using BGP for Auto-Discovery and Signaling' Jan. 2007.
Rosen, E. et al., "BGP/MPLS VPNs", Mar. 1999.
Abawajy J. "An Approach to Support a Single Service Provider Address Image for Wide Area Networks Environment" Centre for Parallel and Distributed Computing, School of Computer Science Carleton University, Ottawa, Ontario, K1S 5B6, Canada.
Office Action for U.S. Appl. No. 13/425,238, filed Mar. 20, 2012, dated Mar. 12, 2015.
Office Action for U.S. Appl. No. 14/577,785, filed Dec. 19, 2014, dated Apr. 13, 2015.
Mahalingam "VXLAN: A Framework for Overlaying Virtualized Layer 2 Networks over Layer 3 Networks" Oct. 17, 2013 pp. 1-22, Sections 1, 4 and 4.1.
Office action dated Apr. 30, 2015, U.S. Appl. No. 13/351,513, filed Jan. 17, 2012.
Office Action dated Apr. 1, 2015, U.S. Appl. No. 13/656,438, filed Oct. 19, 2012.
Office Action dated May 21, 2015, U.S. Appl. No. 13/288,822, filed Nov. 3, 2011.
Siamak Azodolmolky et al. "Cloud computing networking: Challenges and opportunities for innovations", IEEE Communications Magazine, vol. 51, No. 7, Jul. 1, 2013.
Office Action dated Apr. 1, 2015 U.S. Appl. No. 13/656,438, filed Oct. 19, 2012.
Office action dated Jun. 8, 2015, U.S. Appl. No. 14/178,042, filed Feb. 11, 2014.
Office Action Dated Jun. 10, 2015, U.S. Appl. No. 13/890,150, filed May 8, 2013.
Office Action dated Jun. 18, 2015, U.S. Appl. No. 13/098,490, filed May 2, 2011.
Office Action dated Jun. 16, 2015, U.S. Appl. No. 13/048,817, filed Mar. 15, 2011.
Touch, J. et al., 'Transparent Interconnection of Lots of Links (TRILL): Problem and Applicability Statement', May 2009, Network Working Group, pp. 1-17.
Zhai F. Hu et al. 'RBridge: Pseudo-Nickname; draft-hu-trill-pseudonode-nickname-02.txt', May 15, 2012.
Office Action dated Jul. 31, 2015, U.S. Appl. No. 13/598,204, filed Aug. 29, 2014.
Office Action dated Jul. 31, 2015, U.S. Appl. No. 14/473,941, filed Aug. 29, 2014.
Office Action dated Jul. 31, 2015, U.S. Appl. No. 14/488,173, filed Sep. 16, 2014.
Office Action dated Aug. 21, 2015, U.S. Appl. No. 13/776,217, filed Feb. 25, 2013.
Office Action dated Aug. 19, 2015, U.S. Appl. No. 14/156,374, filed Jan. 15, 2014.
Office Action dated Sep. 2, 2015, U.S. Appl. No. 14/151,693, filed Jan. 9, 2014.
Office Action dated Sep. 17, 2015, U.S. Appl. No. 14/577,785, filed Dec. 19, 2014.
Office Action dated Sep. 22, 2015 U.S. Appl. No. 13/656,438, filed Oct. 19, 2012.
Office Action dated Nov. 5, 2015, U.S. Appl. No. 14/178,042, filed Feb. 11, 2014.
Office Action dated Oct. 19, 2015, U.S. Appl. No. 14/215,996, filed Mar. 17, 2014.
Office Action dated Sep. 18, 2015, U.S. Appl. No. 13/345,566, filed Jan. 6, 2012.
Open Flow Switch Specification Version 1.1.0, Feb. 28, 2011.
Open Flow Switch Specification Version 1.0.0, Dec. 31, 2009.
Open Flow Configuration and Management Protocol 1.0 (OF-Config 1.0) Dec. 23, 2011.
Open Flow Switch Specification Version 1.2 Dec. 5, 2011.
Office action dated Feb. 2, 2016, U.S. Appl. No. 13/092,460, filed Apr. 22, 2011.
Office Action dated Feb. 2, 2016. U.S. Appl. No. 14/154,106, filed Jan. 13, 2014.
Office Action dated Feb. 3, 2016, U.S. Appl. No. 13/098,490, filed May 2, 2011.
Office Action dated Feb. 4, 2016, U.S. Appl. No. 13/557,105, filed Jul. 24, 2012.
Office Action dated Feb. 11, 2016, U.S. Appl. No. 14/488,173, filed Sep. 16, 2014.
Office Action dated Feb. 24, 2016, U.S. Appl. No. 13/971,397, filed Aug. 20, 2013.
Office Action dated Feb. 24, 2016, U.S. Appl. No. 12/705,508, filed Feb. 12, 2010.
Office Action dated Jul. 6, 2016, U.S. Appl. No. 14/618,941, filed Feb. 10, 2015.
Office Action dated Jul. 20, 2016, U.S. Appl. No. 14/510,913, filed Oct. 9, 2014.
Office Action dated Jul. 29, 2016, U.S. Appl. No. 14/473,941, filed Aug. 29, 2014.
Office Action dated Jul. 28, 2016, U.S. Appl. No. 14/284,212, filed May 21, 2016.
Office Action dated Jan. 31, 2017, U.S. Appl. No. 13/184,526, filed Jul. 16, 2011.
Office Action dated Jan. 27, 2017, U.S. Appl. No. 14/216,292, filed Mar. 17, 2014.
Office Action dated Jan. 26, 2017, U.S. Appl. No. 13/786,328, filed Mar. 5, 2013.
Office Action dated Dec. 2, 2016, U.S. Appl. No. 14/512,268, filed Oct. 10, 2014.
Office Action dated Dec. 1, 2016, U.S. Appl. No. 13/899,849, filed May 22, 2013.
Office Action dated Dec. 1, 2016, U.S. Appl. No. 13/656,438, filed Oct. 19, 2012.
Office Action dated Nov. 30, 2016, U.S. Appl. No. 13/598,204, filed Aug. 29, 2012.

(56) References Cited

OTHER PUBLICATIONS

Office Action dated Nov. 21, 2016, U.S. Appl. No. 13/669,357, filed Nov. 5, 2012.
Office Action dated Feb. 8, 2017, U.S. Appl. No. 14/473,941, filed Aug. 29, 2014.
Office Action dated Feb. 8, 2017, U.S. Appl. No. 14/822,380, filed Aug. 10, 2015.

* cited by examiner

INTEGRATED FIBRE CHANNEL SUPPORT IN AN ETHERNET FABRIC SWITCH

RELATED APPLICATIONS

This application claims the benefit of U.S. Provisional Application No. 61/557,268, titled "VCS FCoE: FC Interconnect," by inventors Phanidhar Koganti and Suresh Vobbilisetty, filed 8 Nov. 2011, the disclosure of which is incorporated by reference herein.

The present disclosure is related to U.S. patent application Ser. No. 13/087,239, titled "Virtual Cluster Switching," by inventors Suresh Vobbilisetty and Dilip Chatwani, filed 14 Apr. 2011, and to U.S. patent application Ser. No. 13/598,204, titled "End-to-End Lossless Ethernet in Ethernet Fabric," by inventors Huan Song, Phanidhar Koganti, Mythilikanth Raman, and Rajnish Gupta, filed 29 Aug. 2012, the disclosures of which are incorporated by reference herein.

BACKGROUND

Field

The present disclosure relates to network management. More specifically, the present disclosure relates to a method and system for efficient integration of a storage area network to a Transparent Interconnection of Lots of Links (TRILL) network.

Related Art

The exponential growth of the Internet has made it a popular delivery medium for multimedia applications, such as video on demand and television. Such applications have brought with them an increasing demand for bandwidth. As a result, equipment vendors race to build larger and faster switches with versatile capabilities, such as Fibre Channel (FC) connectivity, to move more traffic efficiently. However, the size of a switch cannot grow infinitely. It is limited by physical space, power consumption, and design complexity, to name a few factors. Furthermore, switches with higher capability are usually more complex and expensive. More importantly, because an overly large and complex system often does not provide economy of scale, simply increasing the size and capability of a switch may prove economically unviable due to the increased per-port cost.

A flexible way to improve the scalability of a switch system is to build a fabric switch. A fabric switch is a collection of individual member switches. These member switches form a single, logical switch that can have an arbitrary number of ports and an arbitrary topology. As demands grow, customers can adopt a "pay as you grow" approach to scale up the capacity of the fabric switch.

Meanwhile, layer-2 (e.g., Ethernet) switching technologies continue to evolve. More routing-like functionalities, which have traditionally been the characteristics of layer-3 (e.g., Internet Protocol or IP) networks, are migrating into layer-2. Notably, the recent development of the Transparent Interconnection of Lots of Links (TRILL) protocol allows Ethernet switches to function more like routing devices. TRILL overcomes the inherent inefficiency of the conventional spanning tree protocol, which forces layer-2 switches to be coupled in a logical spanning-tree topology to avoid looping. TRILL allows routing bridges (RBridges) to be coupled in an arbitrary topology without the risk of looping by implementing routing functions in switches and including a hop count in the TRILL header.

As more data-intensive applications are deployed, high-performance layer-2 communication to a storage area network is becoming progressively more important as a value proposition for network architects. It is desirable to provide data flows from a storage device with a quality of service while providing the flexibility and ease of deployment of the layer-2 communication.

While TRILL brings many desirable features to a network, some issues remain unsolved in efficient Fibre Channel integration.

SUMMARY

One embodiment of the present invention provides a switch. The switch includes one or more ports capable of receiving packets based on a first protocol, a packet processor, and a device management module. During operation, the packet processor constructs a notification message containing a switch identifier which is based on a second protocol and associated with a router that operates on the first protocol. The device management module operates in conjunction with the packet processor and terminates forwarding for a packet which is encapsulated with the second protocol and has the switch identifier based on the second protocol as an egress RBridge identifier.

In a variation on this embodiment, the first protocol is a Fibre Channel protocol. The second protocol is a Transparent Interconnection of Lots of Links (TRILL) protocol. The switch identifier is a Routing Bridge (RBridge) identifier. The router that operates on the first protocol is a Fibre Channel router. Furthermore, the packet processor extracts a Fibre Channel packet from a received TRILL packet. The destination address of the Fibre Channel packet corresponds to the Fibre Channel router.

In a further variation on this embodiment, the Fibre Channel packet is encapsulated in an Ethernet frame.

In a variation on this embodiment, the device management module identifies a media access control (MAC) address of the router that operates on the first protocol as a local MAC address associated with the switch.

In a variation on this embodiment, the switch also includes an identification module and a flow control module. The identification module identifies a class of service associated with the Fibre Channel router. The flow control module configures priority-based flow control associated with the class of service.

In a further variation on this embodiment, the packet processor creates a notification message for a remote switch in response to identifying the class of service. The notification message contains the class of service associated with the priority-based flow control configured for the switch.

In a variation on this embodiment, the packet processor is further configurable to construct a notification message for a remote switch, wherein the notification message contains information learned locally.

In a variation on this embodiment, the switch also includes a forwarding module which makes local routing decision for a TRILL packet using a routing protocol instance. The TRILL packet contains a Fibre Channel packet or a non-Fibre Channel packet.

In a further variation on this embodiment, the routing protocol corresponds to one of: 1) Open Shortest Path First (OSPF); 2) Intermediate System To Intermediate System (IS-IS); and 3) Distance-vector.

In a variation on this embodiment, the switch also includes a fabric switch management module which maintains a membership in a fabric switch. Such a fabric switch accommodates a plurality of switches and operates as a single logical switch.

DETAILED DESCRIPTION

Figure 1A:
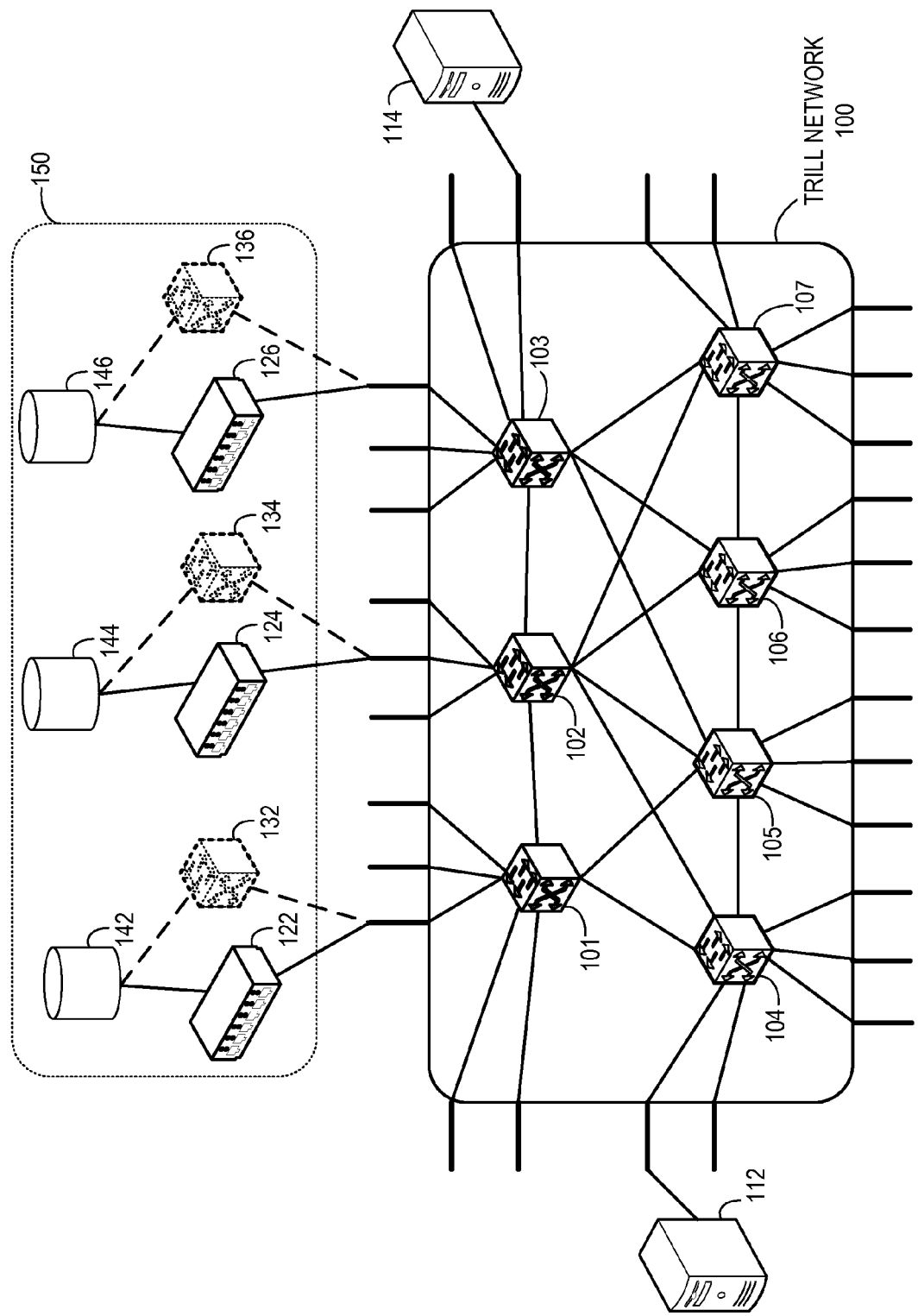
FIG. 1A illustrates an exemplary TRILL network coupled to virtualized Fiber Channel (FC) routers, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present invention, the problem of extending a Fibre Channel (FC) fabric domain to a Transparent Interconnection of Lots of Links (TRILL) network is solved by facilitating packet forwarding in the TRILL network toward FC routers. Typically, a storage area network is dedicated to provide access to unit-level data (e.g., a data block) from target storage devices. Such a storage area network can make a storage device, such as a disk array, accessible to a remote server (i.e., a server not locally coupled to the storage device) such a way that the target appears as a storage device locally coupled to the server. Fibre Channel (FC) is a networking technology designed for efficiently move data through a storage area network. More details on FC network architecture, protocols, naming/address conventions, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosures of which are incorporated by reference in their entirety herein.

FC provides quality of service to a data flow between a server and a storage device, such as a RAID array or a tape backup device. However, to benefit from FC, a respective server requires a dedicated FC network interface card. Because a server typically exchanges information with a non-FC device via a layer-2 communication protocol, such as Ethernet, the server needs another network interface card (e.g., Ethernet network interface card) to communicate with the non-FC device. As a result, the server requires at least two interface cards (i.e., an Ethernet and an FC interface cards) to operate. Equipping a respective server with multiple interface cards in a large server farm incurs a high deployment cost. More importantly, multiple interfaces cards in a respective server lead to substantial power consumption, a high operational cost, and a large carbon footprint for the server farm.

To solve this problem, FC routing capability can be integrated with an RBridge. An RBridge with FC routing capability can be referred to as a hybrid RBridge. One or more hybrid RBridges can be deployed in a TRILL network to couple a storage area network (i.e., an FC fabric) with the TRILL network. A respective hybrid RBridge presents the locally coupled FC routers as virtual RBridges to rest of the TRILL network and facilitate packet forwarding towards the FC routers in the TRILL network. Note that the rest of the TRILL network perceives a respective virtual RBridge as a regular RBridge coupled to the hybrid RBridge. A layer-2 (e.g., Ethernet) interface card couples a respective server with the TRILL network. To communicate with a target storage device, the server creates an FC packet for a corresponding FC router, encapsulates the FC packet in an Ethernet frame, and forwards the frame via the Ethernet interface card to the TRILL network. This encapsulation can be referred to as Fibre Channel over Ethernet (FCoE). An FC packet encapsulated in an Ethernet frame can be referred to as an FCoE frame.

Upon receiving the FCoE frame, an ingress RBridge identifies the destination of the frame to be a virtual RBridge. The ingress RBridge in the TRILL network is not aware of the FC routing capability of the hybrid RBridge. Hence, the ingress RBridge encapsulates the frame in a TRILL packet and forwards the frame toward the virtual RBridge. When the hybrid RBridge associated with the virtual RBridge receives the packet, the hybrid RBridge extracts the FC packet and forwards the FC packet to the FC router corresponding to the virtual RBridge. The FC router, in turn, forwards the frame to the target. In this way, the hybrid RBridge enables the server to communicate with a target storage device with the flexibility of a TRILL network and the performance of an FC fabric while using a single interface.

In some embodiments, the TRILL network is a fabric switch and a respective RBridge in the TRILL network is a member switch of the fabric switch. The fabric switch can be an Ethernet fabric switch. In an Ethernet fabric switch, any number of switches coupled in an arbitrary topology may logically operate as a single switch. Any new switch may join or leave the fabric switch in "plug-and-play" mode without any manual configuration. A fabric switch appears as a single logical switch to the end device.

In a fabric switch, the hybrid RBridge also virtualizes a respective FC router and presents the FC router to the rest of the fabric switch as a virtual member switch coupled to the hybrid RBridge. In some embodiments, the control plane of the fabric switch operates as a Fibre Channel fabric. Consequently, the hybrid RBridge can use the domain identifier of an FC router as the identifier to the virtual member switch. In this way, the hybrid RBridge extends the FC fabric domain to the fabric switch domain.

Although the present disclosure is presented using examples based on TRILL and FC, embodiments of the present invention are not limited to networks defined using TRILL, FC, or a particular Open System Interconnection Reference Model (OSI reference model) layer. For example, embodiments of the present invention can also be applied to a multi-protocol label switching (MPLS) network. In this disclosure, the term "TRILL network" is used in a generic sense, and can refer to any networking layer, sub-layer, or a combination of networking layers. The term "Fibre Channel" or "FC" is also used in a generic sense, and can refer to any networking technology for a storage area network.

The term "RBridge" refers to routing bridges, which are bridges implementing the TRILL protocol as described in Internet Engineering Task Force (IETF) Request for Comments (RFC) "Routing Bridges (RBridges): Base Protocol Specification," available at http://tools.ietf.org/html/rfc6325, which is incorporated by reference herein. Embodiments of the present invention are not limited to application among RBridges. Other types of switches, routers, and forwarders can also be used.

In this disclosure, the term "edge port" refers to a port on an RBridge which sends/receives data frames in native Ethernet format. The term "TRILL port" refers to a port which sends/receives data frames encapsulated with a TRILL header and outer MAC header.

The term "end device" can refer a host, a conventional layer-2 switch, or any other type of network device. Additionally, an end device can be coupled to other switches or hosts further away from a network. An end device can also be an aggregation point for a number of network devices to enter the network. From a storage area network's perspective, an end device can be a server requesting data from the storage area network. In this disclosure, the terms "end device" and "sever" are used interchangeably.

The term "switch identifier" refers to a group of bits that can be used to identify a switch. If the switch is an RBridge, the switch identifier can be an "RBridge identifier." If the switch is an FC router, the switch identifier can be a "domain identifier." Note that the TRILL standard uses "RBridge ID" to denote a 48-bit Intermediate-System-to-Intermediate-System (IS-IS) ID assigned to an RBridge, and "RBridge nickname" to denote a 16-bit value that serves as an abbreviation for the "RBridge ID." In this disclosure, "switch identifier" is used as a generic term, is not limited to any bit format, and can refer to any format that can identify a switch. The term "RBridge identifier" is used in a generic sense, is not limited to any bit format, and can refer to "RBridge ID," "RBridge nickname," or any other format that can identify an RBridge. The term "domain identifier" is also used in a generic sense, is not limited to any bit format, and can refer to any group of bits that uniquely identify a switch in an FC fabric.

The term "frame" refers to a group of bits that can be transported together across a network. "Frame" should not be interpreted as limiting embodiments of the present invention to layer-2 networks. "Frame" can be replaced by other terminologies referring to a group of bits, such as "packet," "cell," or "datagram."

The term "switch" is used in a generic sense, and it can refer to any standalone or fabric switch operating in any network layer. "Switch" should not be interpreted as limiting embodiments of the present invention to layer-2 networks. Any device that can forward traffic to an end device can be referred to as a "switch." Examples of a "switch" include, but are not limited to, a layer-2 switch, a layer-3 router, a TRILL RBridge, an FC router, or an FC switch.

The term "Ethernet fabric switch" refers to a number of interconnected physical switches which form a single, scalable logical switch. In a fabric switch, any number of switches can be connected in an arbitrary topology, and the entire group of switches functions together as one single, logical switch. This feature makes it possible to use many smaller, inexpensive switches to construct a large fabric switch, which can be viewed as a single logical switch externally.

Network Architecture

FIG. 1A illustrates an exemplary TRILL network coupled to virtualized FC routers, in accordance with an embodiment of the present invention. As illustrated in FIG. 1, a TRILL network 100 includes RBridges 101, 102, 103, 104, 105, 106, and 107. End devices 112 and 114 are servers coupled to network 100 via RBridges 104 and 103, respectively. RBridges in network 100 use edge ports to communicate to end devices and TRILL ports to communicate to other RBridges. Data frames transmitted and received via TRILL ports are encapsulated in TRILL headers. For example, RBridge 104 is coupled to end device 112 via an edge port and to RBridges 105, 101, and 102 via TRILL ports. In this example, RBridges 101, 102, and 103 are hybrid RBridges with FC routing capabilities, and coupled to storage area network 150.

In some embodiments, storage area network 150 is an FC fabric and includes FC routers 122, 124, and 126. Target storage devices 142, 144, and 146 are coupled to FC routers 122, 124, and 126, respectively. FC fabric 150 is dedicated to provide access to data blocks from targets 142, 144, and 146. Typically, to access targets 142, 144, and 146, servers 112 and 114 require dedicated FC network interface cards. Servers 112 and 114 also need another network interface card (e.g., Ethernet network interface card) to communicate with non-FC devices. Equipping server 112 and 114 with multiple interface cards incurs a high deployment cost and substantial power consumption.

To solve this problem, hybrid RBridges 101, 102, and 103 present FC routers 122, 124, and 126 as virtual RBridges 132, 134, and 136, respectively, to RBridges 104, 105, 106, and 107. Note that RBridges 104, 105, 106, and 107 perceive virtual RBridges 132, 134, and 136 as regular RBridges coupled to hybrid RBridges 101, 102, and 103, respectively. In some embodiments, network 100 is a fabric switch and the RBridges in network 100 are member switches of the fabric switch. This fabric switch appears as a single logical switch to servers 112 and 114.

In some embodiments, the control plane for network 100 operates as a FC fabric and RBridge identifiers in network 100 are in the same format as the domain identifier of FC routers 122, 124, and 126. Hybrid RBridges 101, 102, and 103 advertize the domain identifiers of FC routers 122, 124, and 126 as the identifiers of virtual RBridges 132, 134, and 136. In this way, hybrid RBridges 101, 102, and 103 extend the domain of storage area network 150 to the domain of network 100. As a result, a single routing protocol instance in a respective RBridge in network 100 can make routing decisions for TRILL packets containing Fibre Channel or non-Fibre Channel packets. Examples of the routing protocol can include, but are not limited to Open Shortest Path First (OSPF) routing protocol, Intermediate System To Intermediate System (IS-IS) routing protocol, and Distance-vector routing protocol.

During operation, hybrid RBridges 101, 102, and 103, optionally, learns about targets 142, 144, and 146, from FC routers 122, 124, and 126, respectively. Hybrid RBridges 101, 102, and 103, in turn, create and send notification messages to RBridges 104, 105, 106, and 107 indicating that targets 142, 144, and 146 are coupled to virtual RBridges 132, 134, and 136, respectively. To communicate with target 142, server 112 creates an FC packet, encapsulates the FC packet in an Ethernet frame, and forwards the FCoE frame to ingress RBridge 104. While constructing the FCoE frame, server 112 assigns a domain identifier of FC router 122 as the destination address of the inner FC packet and the MAC address of FC router 122 as the destination address of the Ethernet frame.

In some embodiments, upon receiving the FCoE frame, RBridge 104 checks the encapsulated FC packet and identifies destination target 142 to be coupled to virtual RBridge 132. RBridge 104 is not aware of the FC routing capability of hybrid RBridge 101. Hence, RBridge 104 simply uses regular TRILL routing for forwarding the FCoE frame to virtual RBridge 132. Using the local routing protocol instance, RBridge 104 determines the next-hop RBridge to be RBridge 101. RBridge 104 then encapsulates the FCoE frame in a TRILL packet destined to virtual RBridge 132 (i.e., with the identifier of virtual RBridge 132 as the egress RBridge identifier) and forwards the packet to hybrid RBridge 101. In some embodiments, hybrid RBridge 101 marks the RBridge identifier of virtual RBridge 132 as a local RBridge identifier (i.e., as belonging to hybrid RBridge 101). Upon receiving the TRILL packet, hybrid RBridge 101 recognizes the RBridge identifier as a local RBridge identifier and terminates TRILL forwarding for the packet.

In some embodiments, hybrid RBridge 101 marks the MAC address of FC router 122 as a local MAC address. The MAC address of FC router 122 can be derived from the domain identifier of FC router 122. Hybrid RBridge 101 then extracts the FCoE frame from the TRILL packet and recognizes the destination address of the FCoE frame to be a local MAC address. In other words, hybrid RBridge 101 considers the FCoE frame to be destined to itself. As a result, hybrid RBridge 101 decapsulates the Ethernet frame, promotes the internal FC packet to the upper layer, and forwards the FC packet to FC router 122 coupled to target 142. Similarly, server 114 can communicate with target 144 via hybrid RBridges 103 and 102, and FC router 124. In this way, hybrid RBridge 101, 102, and 103 allow servers 112 and 114 to access targets 142, 144, and 146 via network 100 using one layer-2 interface.

In some embodiments, network 100 ensures automatic priority-based flow control configuration for all RBridges in network 100. Upon identifying FC router 122, hybrid RBridge 101 obtains the class of service associated with the FC traffic from FC router 122 and configures priority-based flow control for the class of service. In the same way, hybrid RBridges 102 and 103 also obtains the class of service for FC traffic from FC routers 124 and 126, respectively. Hybrid RBridges 101, 102, and 103 propagate the associated configuration information to respective other RBridges in network 100. Upon receiving the configuration information, other RBridges self-configure the priority-based flow control for that specific class of service. In this way, RBridges in network 100 provide a desired quality of service to the FCoE frames.

Figure 1B:
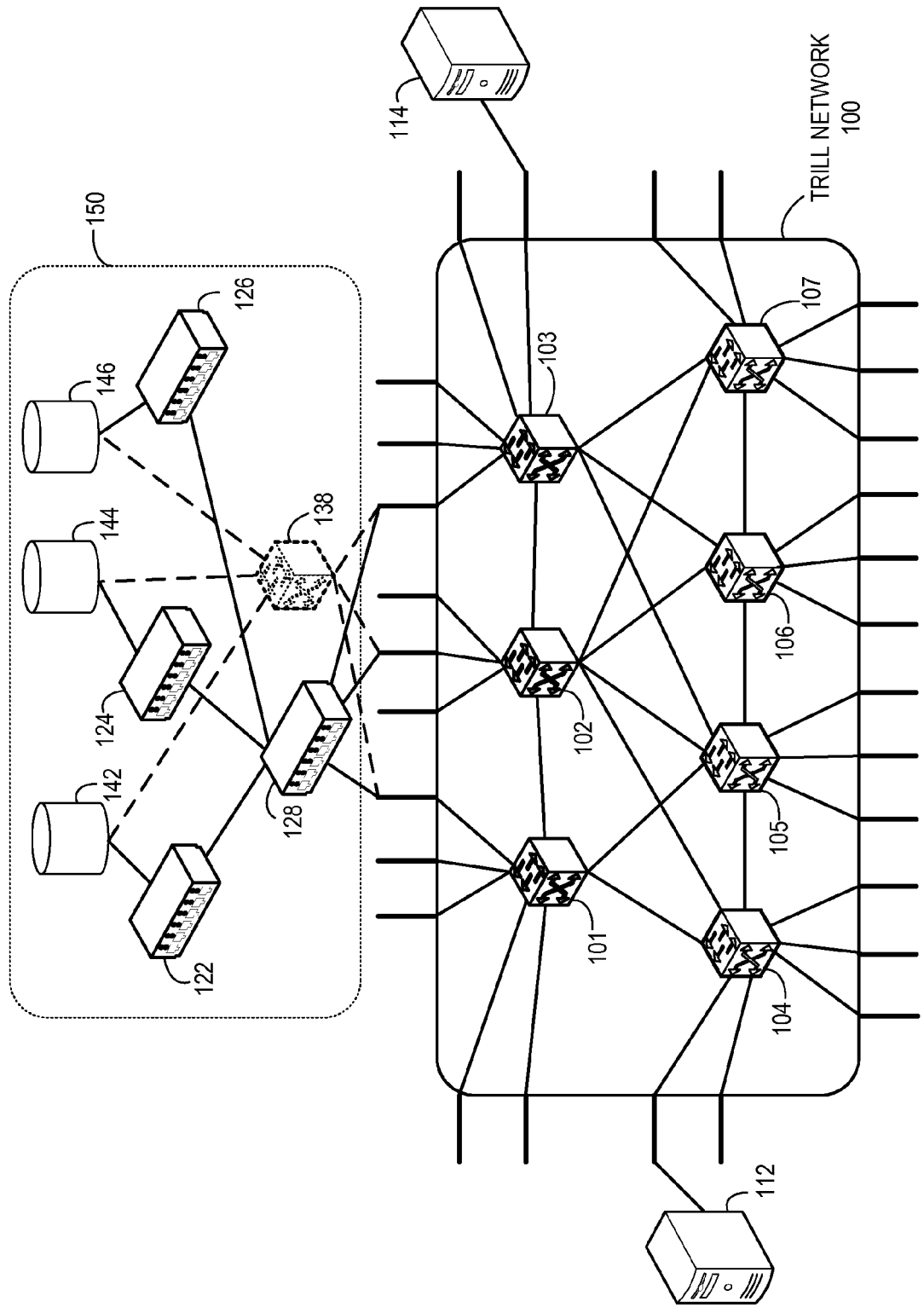
FIG. 1B illustrates an exemplary TRILL network coupled to virtualized FC routers with hierarchical interconnections, in accordance with an embodiment of the present invention.

FIG. 1B illustrates an exemplary TRILL network coupled to virtualized FC routers hierarchical interconnections, in accordance with an embodiment of the present invention. Components in FIG. 1B are the same as in FIG. 1A, so the same numerals are used to denote them. In this example, FC router 128 is coupled to FC routers 122, 124, and 126. FC router 128 virtualizes FC routers 122, 124, and 126, and presents targets 142, 144, and 146 to hybrid RBridges 101, 102, and 103 as coupled to FC router 128. Hybrid RBridges 101, 102, and 103, in turn, present FC router 128 as virtual RBridge 138 to RBridges 104, 105, 106, and 107. To ensure a separation between network 100 and FC fabric 150, a respective local FC port of hybrid RBridges 101, 102, and 103 can be an EX_port while the peer port of FC router 128 can be an E port. As a result, topology information of network 100 is not propagated to FC fabric 150.

During operation, to communicate with target 144, server 114 creates an FCoE frame, and forwards the FCoE frame to ingress RBridge 103. RBridge 103 checks the encapsulated FC packet and identifies destination target 144 to be coupled to virtual RBridge 138. RBridge 103 recognizes the identifier of virtual RBridge to be a local identifier, extracts the FC packet from the FCoE frame, and forwards the FC packet to FC router 128. FC router 128, in turn, forwards the FC packet to FC router 124 coupled to target 144. Similarly, server 112 communicates with target 146 via RBridge 104, hybrid RBridge 101, and FC router 128.

In some embodiments, FC router 128 provides zoning support to targets 142, 144, and 146. Such zoning support is required to create logical partitions in FC fabric 150. A respective logical partition enables a selective communication between hybrid RBridges 101, 102, and 103, and targets 142, 144, and 146. In some embodiments, FC router 128 uses the logical partitions to present the targets as parts of different storage area networks. For example, if targets 142 and 144 belong to one zone while target 146 belongs to a different zone, FC router 128 presents a respective zone to hybrid RBridge 101, 102, and 103 as separate storage area networks. Consequently, hybrid RBridge 101, 102, and 103 create a virtual RBridge for targets 142 and 144, while another virtual RBridge for target 146.

Network Configuration

Figure 2A:
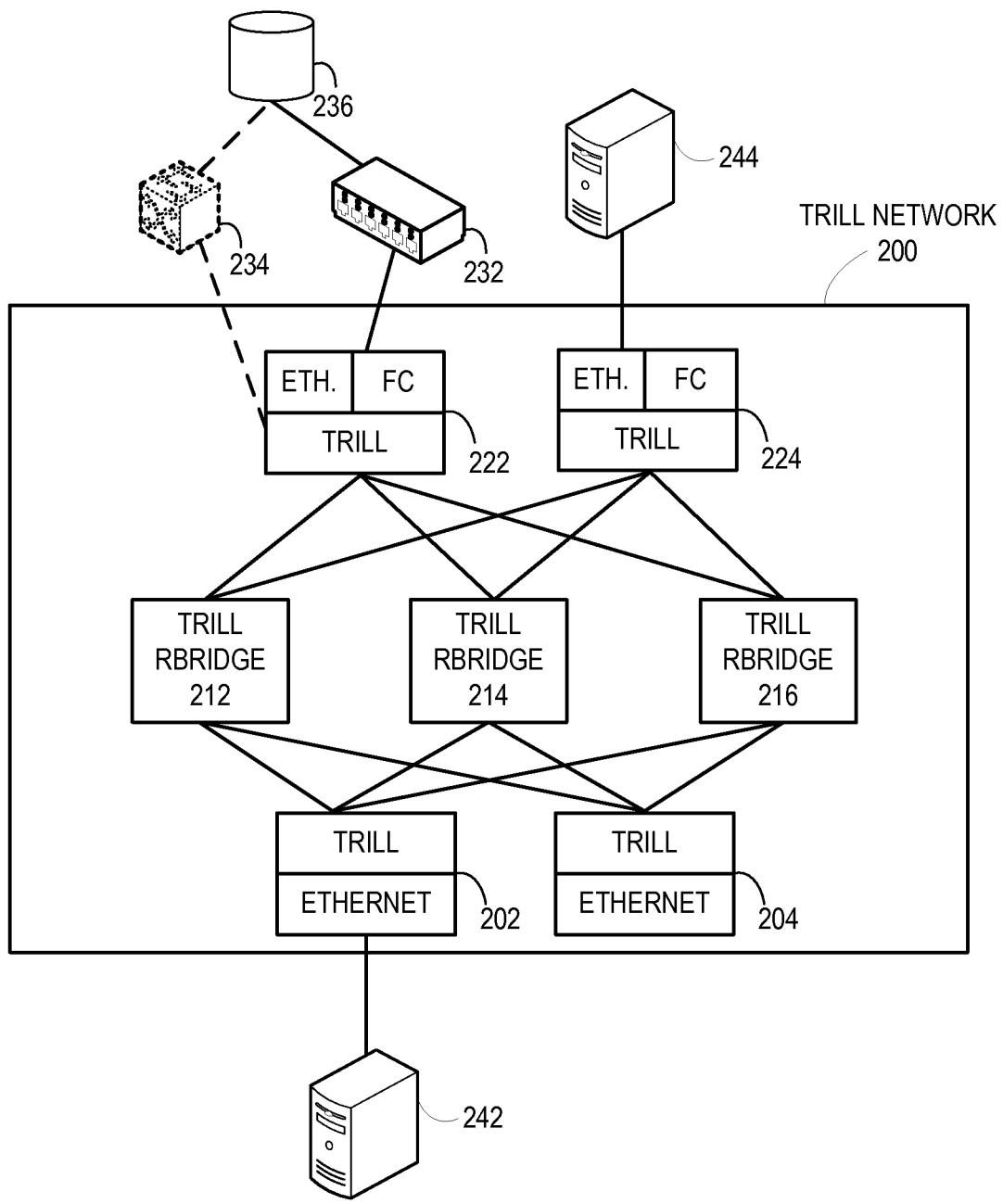
FIG. 2A illustrates an exemplary network configuration of a TRILL network coupled to virtualized FC routers, in accordance with an embodiment of the present invention.

FIG. 2A illustrates an exemplary network configuration of a TRILL network coupled to virtualized FC routers, in accordance with an embodiment of the present invention. In this example, a TRILL network 200 includes TRILL RBridges 212, 214, and 216. Also included are RBridges 202 and 204, each with a number of Ethernet edge ports which can be coupled to end devices. For example, server 242 is coupled with RBridges 202 via an Ethernet edge port. Network 200 also includes hybrid RBridges 222 and 224, each with a number of edge ports for coupling end devices, and a number of FC ports for coupling FC routers. For example, RBridges 224 is coupled with server 244 via an Ethernet edge port and with FC router 232 via an FC EX_port, separating the topology information of network 200 from the FC domain. In some embodiments, hybrid RBridges 222 and 224 have only TRILL and FC ports, and not any Ethernet port. For example, hybrid RBridge 222 can operate without any Ethernet port because no end device is coupled with hybrid RBridge 222. RBridges in network 200 are interconnected with each other using TRILL ports.

Hybrid RBridge 222 creates a notification message presenting FC router 232 as virtual RBridge 234 and target 236 as a storage device coupled to virtual RBridge 234. Hybrid RBridge 222 then sends the notification message to all other RBridges in network. Upon receiving the message, other RBridges considers virtual RBridge 234 as a result RBridge coupled to hybrid RBridge 222. In some embodiments, network 200 is a fabric switch, wherein the notification message is created using an internal messaging service of the fabric switch.

Hybrid RBridges 222 and 224 in network 200 enables server 242 to communicate with target 236 in FC domain via an Ethernet port. During operation, to communicate with target 236, server 242 creates an FCoE frame, and forwards the FCoE frame to ingress RBridge 202 via an Ethernet interface. RBridge 202 checks the encapsulated FC packet and identifies destination target 236 to be coupled to virtual RBridge 234. RBridge 202 encapsulates the FCoE frame in a TRILL packet destined to virtual RBridge 234 and forwards the packet to one of the intermediate RBridges 212, 214, and 216. Because TRILL supports equal-cost multipath routing, a respective TRILL packet from RBridge 202 can be routed to hybrid RBridge 222 via any of RBridges 212, 214, and 216. Because the identifier of virtual RBridge 234 is a local identifier in hybrid RBridge, upon receiving the TRILL packet, hybrid RBridge 222 recognizes the packet to be destined to virtual RBridge 234. Hybrid RBridge 222 then extracts the FC packet and forwards the FC packet to FC router 232 coupled to target 236. Though other RBridges in network 200 perceives virtual RBridge 234 to be coupled to hybrid RBridge 222 via a TRILL port, hybrid RBridge 222 actually forwards the FC packet via a local FC EX_port.

In some embodiments, hybrid RBridges 222 and 224 can also forward non-FC traffic. Server 244 is coupled to hybrid RBridge 224 via an Ethernet port. To communicate with server 244, server 242 creates an Ethernet frame, and forwards the frame to ingress RBridge 202. RBridge 202 checks the destination of the frame and identifies destination server 244 to be coupled to hybrid RBridge 224. RBridge 202 encapsulates the frame in a TRILL packet destined to egress RBridge 224 and forwards the packet to RBridge 224 via one of the intermediate RBridges 212, 214, and 216. Upon receiving the TRILL packet, hybrid RBridge 224 recognizes the TRILL packet to be destined to itself, extracts the Ethernet frame, and forwards the Ethernet frame to server 244. In this way, a hybrid RBridge can forward Ethernet traffic as well as storage (e.g., FC) traffic.

Figure 2B:
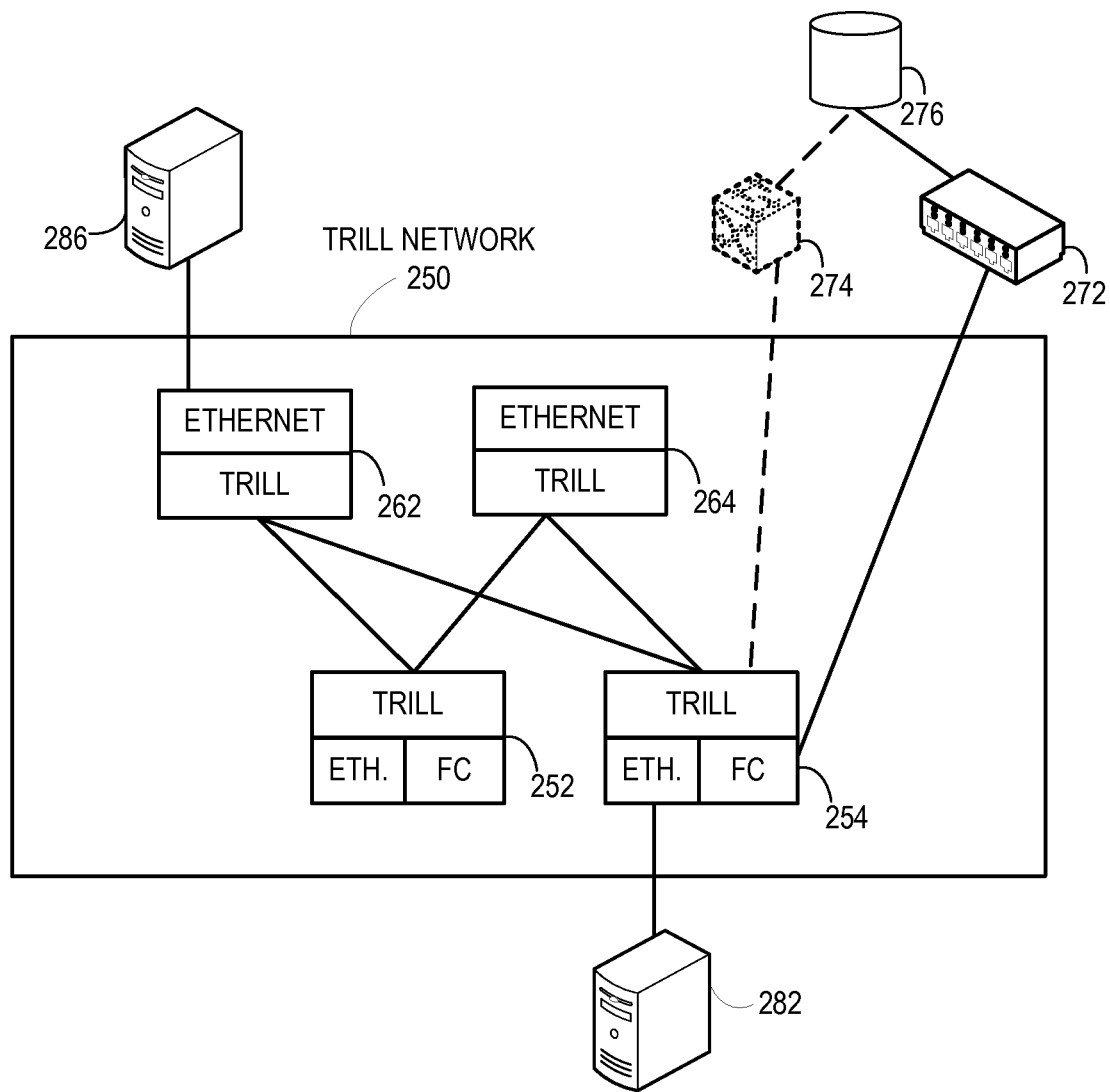
FIG. 2B illustrates an exemplary network configuration of a TRILL network with hybrid RBridges coupled to servers and virtualized FC routers, in accordance with an embodiment of the present invention.

FIG. 2B illustrates an exemplary network configuration of a TRILL network with hybrid RBridges coupled to servers and virtualized FC routers, in accordance with an embodiment of the present invention. In this example, a TRILL network 250 includes TRILL RBridges 262 and 264. Also included are hybrid RBridges 252 and 254, each with a number of edge ports for coupling end devices, and a number of FC ports for coupling FC routers. For example, RBridges 254 is coupled with server 282 via an Ethernet edge port and with FC router 272 via an FC EX_port, separating the topology information of network 250 from the FC domain. Hybrid RBridge 254 creates a notification message presenting FC router 272 as virtual RBridge 274 and target 276 as a storage device coupled to virtual RBridge 274. Hybrid RBridge 254 then sends the notification message to all other RBridges in network. In some embodiments, network 250 is a fabric switch, wherein the notification message is created using an internal messaging service of the fabric switch.

In some embodiments, hybrid RBridge 254 marks the MAC address of FC router 272 as a local MAC address. The MAC address of FC router 272 can be derived from the domain identifier of FC router 272. During operation, to communicate with target 276, server 282 creates an FCoE frame, and forwards the FCoE frame to hybrid RBridge 254 via an Ethernet port. Upon receiving the FCoE frame, hybrid RBridge 254 recognizes the MAC address of the FCoE frame to be a local MAC address and considers the FCoE frame to be destined to itself. As a result, hybrid RBridge 254 extracts the internal FC packet from the FCoE frame and promotes the frame to the upper layer. In the upper layer, hybrid RBridge 254 identifies target 276 as the destination of the FC packet and forwards the FC packet to FC router 272 coupled to target 276. In this way, when hybrid RBridge 254 is coupled to server 282, hybrid RBridge 254 can forward traffic to FC domain without encapsulating the FCoE frame in a TRILL packet. This reduces the load on inter-switch links of network 250.

However, hybrid RBridge 254 still presents FC router 272 as virtual RBridge 274 for other servers coupled to network 250. For example, to communicate with target 276, server 286 creates an FCoE frame and forwards the frame to RBridge 262. Upon receiving the FCoE frame, ingress RBridge 262 encapsulates the frame in a TRILL packet destined to virtual RBridge 274 and forwards the packet to hybrid RBridge 254. Hybrid RBridge 254 receives the TRILL packet, recognizes the TRILL packet to be destined to virtual RBridge 274, extracts the FC packet, and forwards the FC packet to FC router 272 coupled to target 276. Hence, FC router virtualization is required in network 250 even when a hybrid RBridge can forward traffic to FC domain without encapsulating an FCoE frame in a TRILL packet.

Priority-Based Flow Control

Figure 3A:
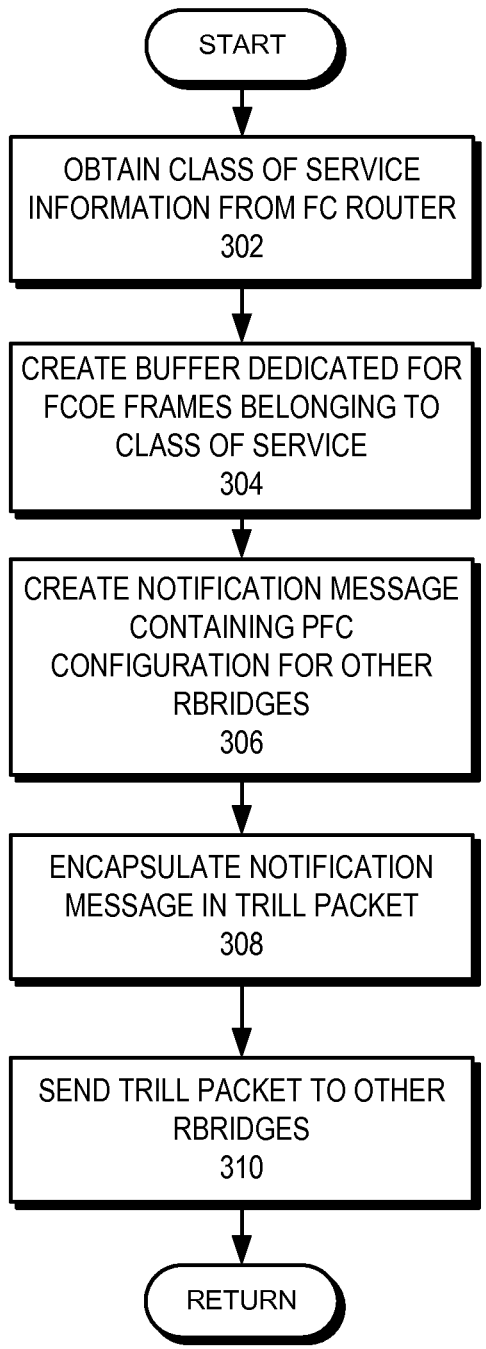
FIG. 3A presents a flowchart illustrating the process of a hybrid RBridge distributing priority-based flow control configuration information to other RBridges in a TRILL network, in accordance with an embodiment of the present invention.

Priority-based flow control facilitates different classes of service for flow control of Ethernet frames. Such flow control enables control over a respective data flow on shared links. Priority-based flow control allows FCoE frames to receive a lossless service from a link shared with traditional lost-tolerant traffic. To facilitate priority-based flow control, whenever a hybrid RBridge learns about a target, the hybrid RBridge configures a class of service associated with the FCoE frames and propagates the configuration information to other RBridges in the TRILL network. FIG. 3A presents a flowchart illustrating the process of a hybrid RBridge distributing priority-based flow control configuration information to other RBridges in a TRILL network, in accordance with an embodiment of the present invention. The hybrid RBridge first receives class of service information associated with FC traffic from a locally coupled FC router (operation 302). The hybrid RBridge then creates a buffer dedicated for the FCoE frames belonging to the class of service (operation 304). In some embodiments, a network administrator can configure the priority-based flow control in the hybrid RBridge.

The hybrid RBridge then creates a notification message containing the priority-based flow control configuration for other RBridges in the TRILL network (e.g., other member switches in a fabric switch) (operation 306). This notification message can be an Ethernet control message. The hybrid RBridge encapsulates the notification message in a TRILL packet (operation 308) and sends the TRILL packet to other RBridges (operation 310). In some embodiments, the hybrid RBridge uses multicast to distribute the notification message.

Figure 3B:
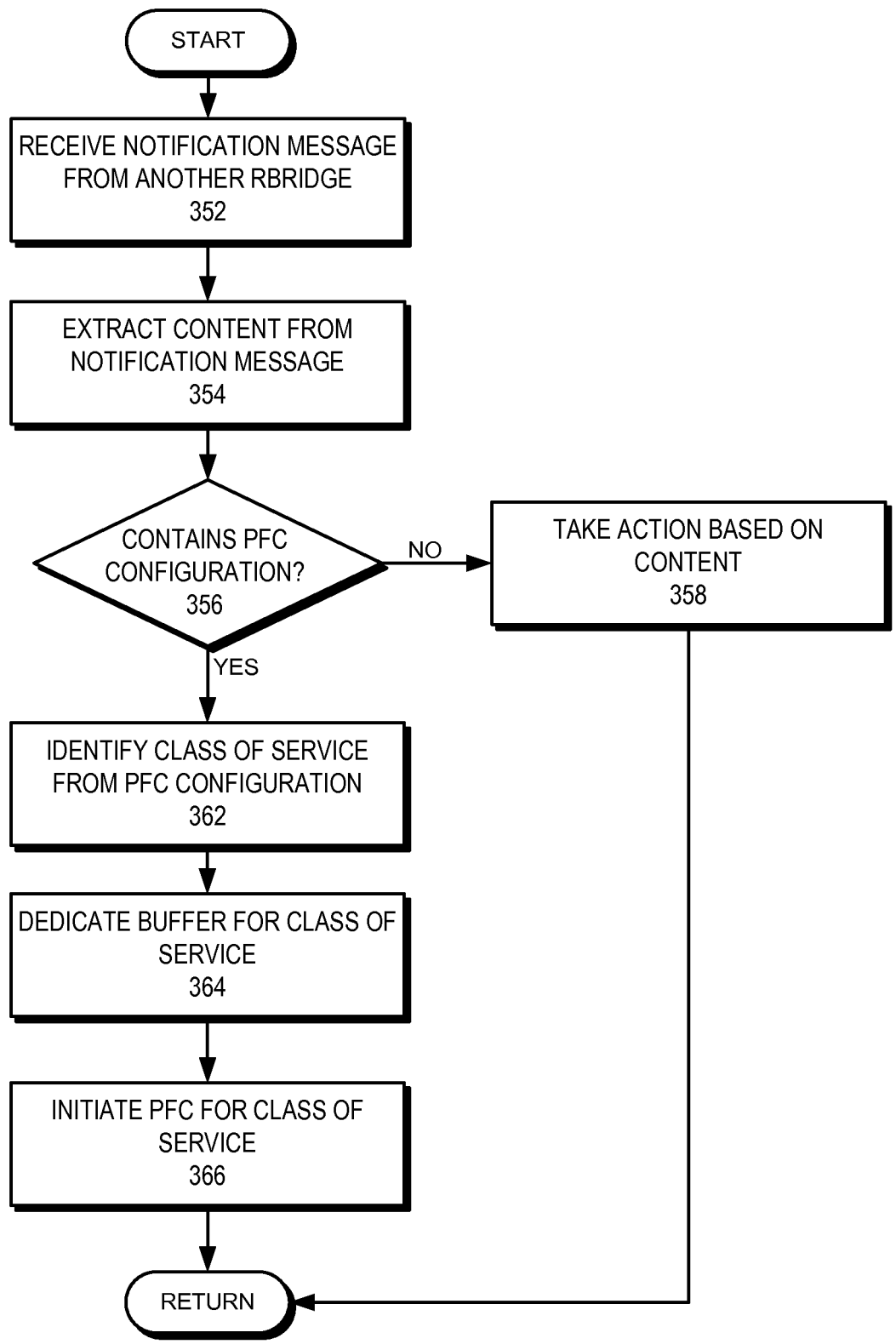
FIG. 3B presents a flowchart illustrating the process of an RBridge self-configuring priority-based flow control based on received information from another RBridge in a TRILL network, in accordance with an embodiment of the present invention.

FIG. 3B presents a flowchart illustrating the process of an RBridge self-configuring priority-based flow control based on received information from another RBridge in a TRILL network, in accordance with an embodiment of the present invention. Upon receiving a notification message from another RBridge (operation 352), the RBridge extracts the content from the notification message (operation 354). In some embodiments, the extraction of the content includes decapsulation of a TRILL header of an Ethernet frame. The RBridge then checks whether the notification message contains any priority-based flow control configuration (operation 356). In some embodiments, the RBridge examines a message type and an associated operation code of the message to determine whether the message pertains to priority-based flow control. If the message does not contain any priority-based flow control configuration, the RBridge takes action based on the content of the message (operation 358).

If the message contains priority-based flow control configuration, the RBridge identifies the class of service from the configuration (operation 362). In some embodiments, the RBridge identifies the class of service by identifying a priority value associated with the class in the message. The RBridge then dedicates a buffer for the class of service (operation 364) and initiates priority-based flow control for the class of service (operation 366). Such initiation can include, but is not limited to, monitoring the dedicated buffer, identifying a potential overflow, and calculating time to transmit frames, both current and incoming, from the buffer. In some embodiments, the RBridge uses priority-based flow control specified by Institute of Electrical and Electronics Engineers (IEEE) specification 802.1Qbb, "Priority-based Flow Control," available at http://www.ieee802.org/1/pages/802.1bb.html, the disclosure of which is incorporated herein in its entirety.

Figure 4A:
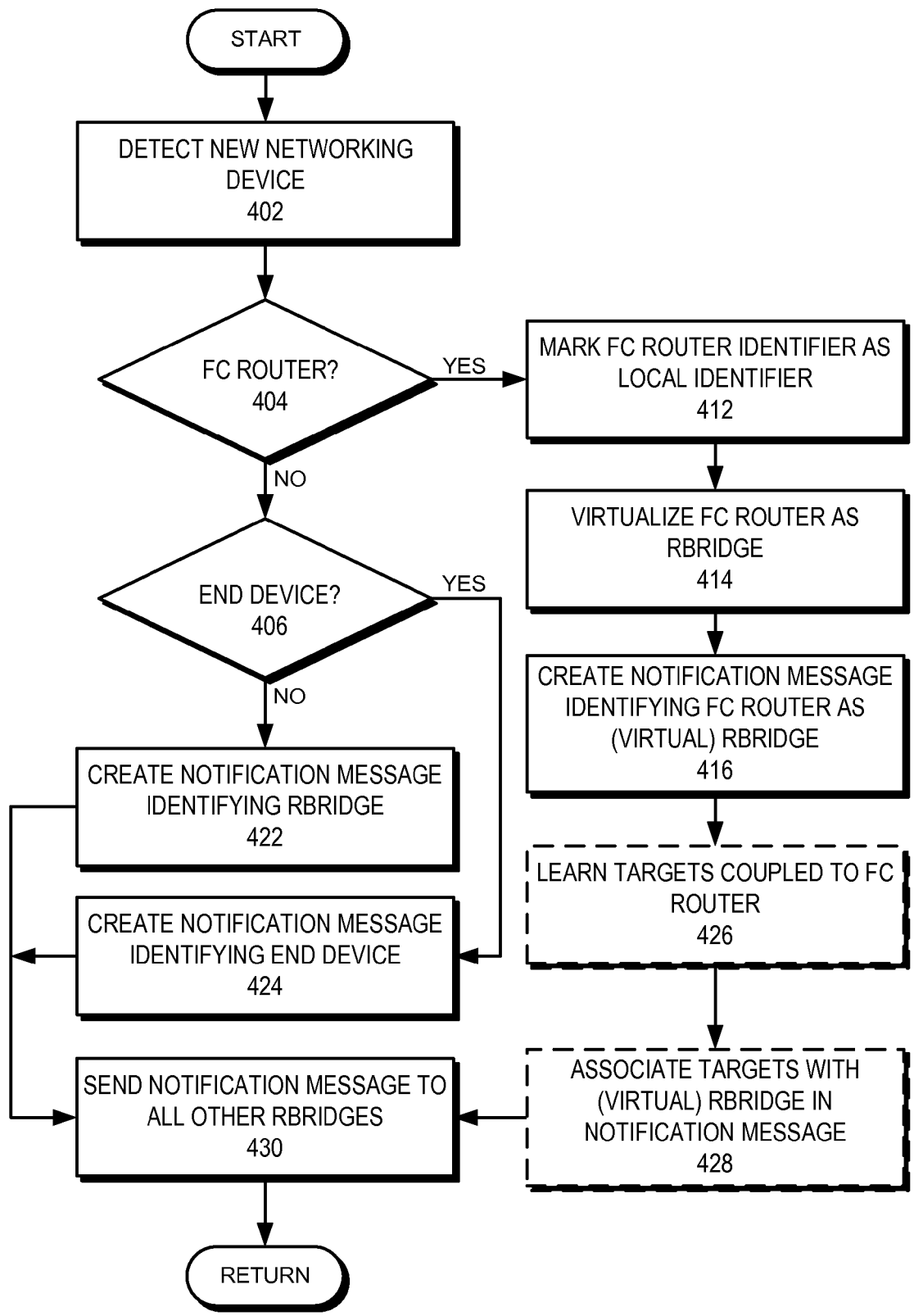
FIG. 4A presents a flowchart illustrating the process of a hybrid RBridge distributing virtualized FC connectivity information to other RBridges in a TRILL network, in accordance with an embodiment of the present invention.

In the example in FIG. 1, when hybrid RBridges 101, 102, and 103 learn about FC routers 122, 124, and 126, hybrid RBridges 101, 102, and 103 dynamically virtualize FC routers 122, 124, and 126, and present them as virtual RBridges 132, 134, and 136, respectively, by sending notification messages to RBridges 104, 105, 106, and 107. Upon receiving the notification messages, RBridges 104, 105, 106, and 107 dynamically learn about virtual RBridges 132, 134, and 136 as regular RBridges coupled to hybrid RBridges 101, 102, and 103, respectively. FIG. 4A presents a flowchart illustrating the process of a hybrid RBridge distributing virtualized FC connectivity information to other RBridges in a TRILL network, in accordance with an embodiment of the present invention. Upon detecting a new networking device (operation 402), the hybrid RBridge checks whether the detected device is an FC router (operation 404). If not, then the hybrid RBridge checks whether the detected device is an end device (operation 406). Note that the detected end device can be a server.

If the detected device is an end device, the hybrid RBridge creates a notification message identifying the end device (operation 424). In some embodiments, the hybrid RBridge detects the end device by learning the MAC address of the end device from a received frame and includes the learned MAC address in the notification message. If the detected device is not an FC router or an end device, the detected device is a new RBridge joining the TRILL network. The hybrid RBridge then creates a notification message identifying the RBridge (operation 422). In some embodiments, the hybrid RBridge detects the new RBridge from a received notification message from another RBridge.

If the identified networking device is an FC router (operation 404), the hybrid RBridge marks the layer-2 identifier of the FC router as a local identifier (operation 412). For example, if the identifier is a MAC address, the hybrid RBridge marks the MAC address of the FC router as a local MAC address. The hybrid RBridge then virtualizes the FC router as an RBridge (operation 414). In some embodiments, the RBridge identifier and the FC domain identifier have the same format, and the domain identifier of the FC router is used as the virtual RBridge identifier. Hybrid RBridge creates a notification message identifying the FC router as a (virtual) RBridge (operation 416). Note that the RBridges receiving the notification message recognize the FC router as a regular RBridge.

The hybrid RBridge can, optionally, learn about the target storage devices coupled to the FC router (operation 426) and associates the targets with the (virtual) RBridge in the notification message (operation 428). After creating a notification message identifying the detected networking device (operation 422, 424, or 428), the hybrid RBridge forwards the notification message to all other RBridges in the TRILL network. In some embodiments, the hybrid RBridge and the other RBridges in the TRILL network can be member switches of a fabric switch. The hybrid RBridge can use an internal messaging service of the fabric switch to create the notification message.

Figure 4B:
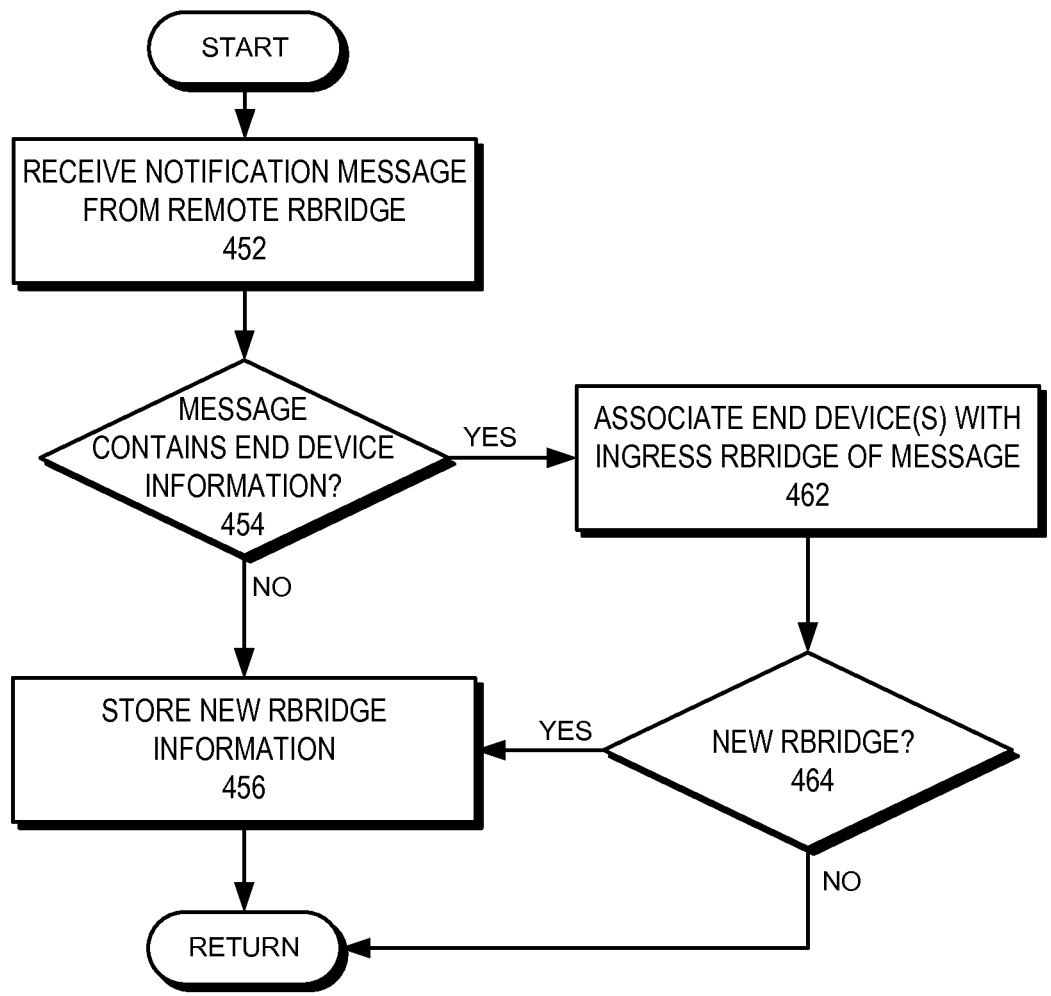
FIG. 4B presents a flowchart illustrating the process of an RBridge learning about other networking devices via a TRILL port, in accordance with an embodiment of the present invention.

FIG. 4B presents a flowchart illustrating the process of an RBridge learning about other networking devices via a TRILL port, in accordance with an embodiment of the present invention. Upon receiving a notification message from a remote RBridge (operation 452), the RBridge checks whether the notification message contains information about one or more end devices (operation 454). If the notification contains end device information, the RBridge associates the end devices with the ingress RBridge of the message (operation 462). The RBridge then checks whether the ingress RBridge is a new RBridge (operation 464). A new RBridge is an RBridge for which the RBridge does not already have information stored in a local database. In some embodiments, the local database maintains the state of a fabric switch and is used to manage the member switches. If the notification message does not contain end device information (operation 454), the notification message contains information about a new RBridge. If the message contains information about a new RBridge (operation 454 or 464), the RBridge stores the new RBridges information in a local database (operation 456). Note that the new RBridge information can include the associated end device information as well.

Frame Processing

Figure 5:
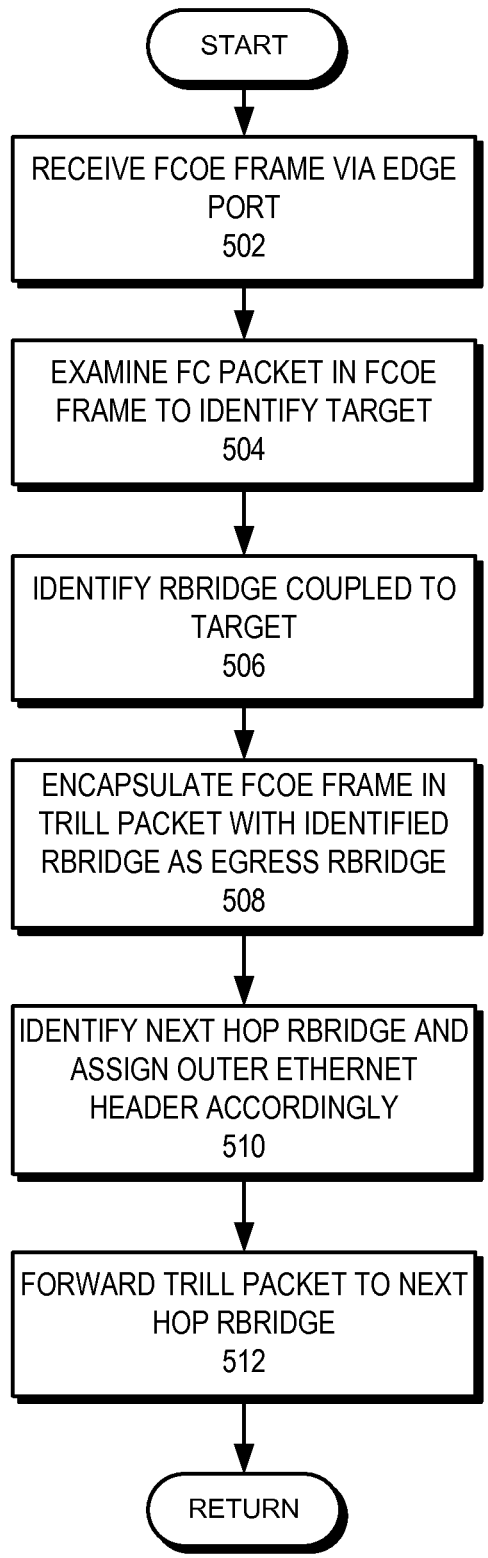
FIG. 5 presents a flowchart illustrating the process of an RBridge forwarding an Ethernet-encapsulated FC packet received from an end device, in accordance with an embodiment of the present invention.

FIG. 5 presents a flowchart illustrating the process of an RBridge forwarding an Ethernet-encapsulated FC packet received from an end device, in accordance with an embodiment of the present invention. The RBridge first receives an FCoE frame from the end device via a local edge port (operation 502). The end device can be a server accessing data from a target storage device in a storage area network. The RBridge then examines the internal FC packet of the receiving FCoE frame to identify the target of the FC frame (operation 504) and identifies the RBridge coupled to the target (operation 506). Note that the identified RBridge can be a virtual RBridge. However, the RBridge considers the virtual RBridge as a regular RBridge and is not aware that the virtual RBridge is actually an FC router.

The RBridge encapsulates the received FCoE frame in a TRILL packet with an identifier of the virtual RBridge as the egress RBridge identifier (operation 508). The RBridge uses local forwarding information to identify the next hop RBridge and assigns the MAC address of the next hop RBridge as the destination address of the outer Ethernet header of the TRILL packet (operation 510). Note that the RBridge uses the same local forwarding information to determine routes for both FC and non-FC traffic. The RBridge forwards the TRILL packet to the next hop RBridge (operation 512). For the example in FIG. 2A, RBridge 202 encapsulates an FCoE frame for target 236 received from server 242 in a TRILL packet with an identifier of virtual RBridge 234 as the egress RBridge identifier. RBridge 202 identifies RBridge 212 as the next hop RBridge and assigns the MAC address of RBridge 212 as the destination address of the outer Ethernet header of the TRILL packet. RBridge 202 then forwards the TRILL packet to RBridge 212 based on the local forwarding information. Because the egress RBridge of the TRILL packet is RBridge 222, intermediate RBridge 212 does not examine the internal FC frame and forwards the TRILL packet to RBridge 222 using regular TRILL routing.

Figure 6:
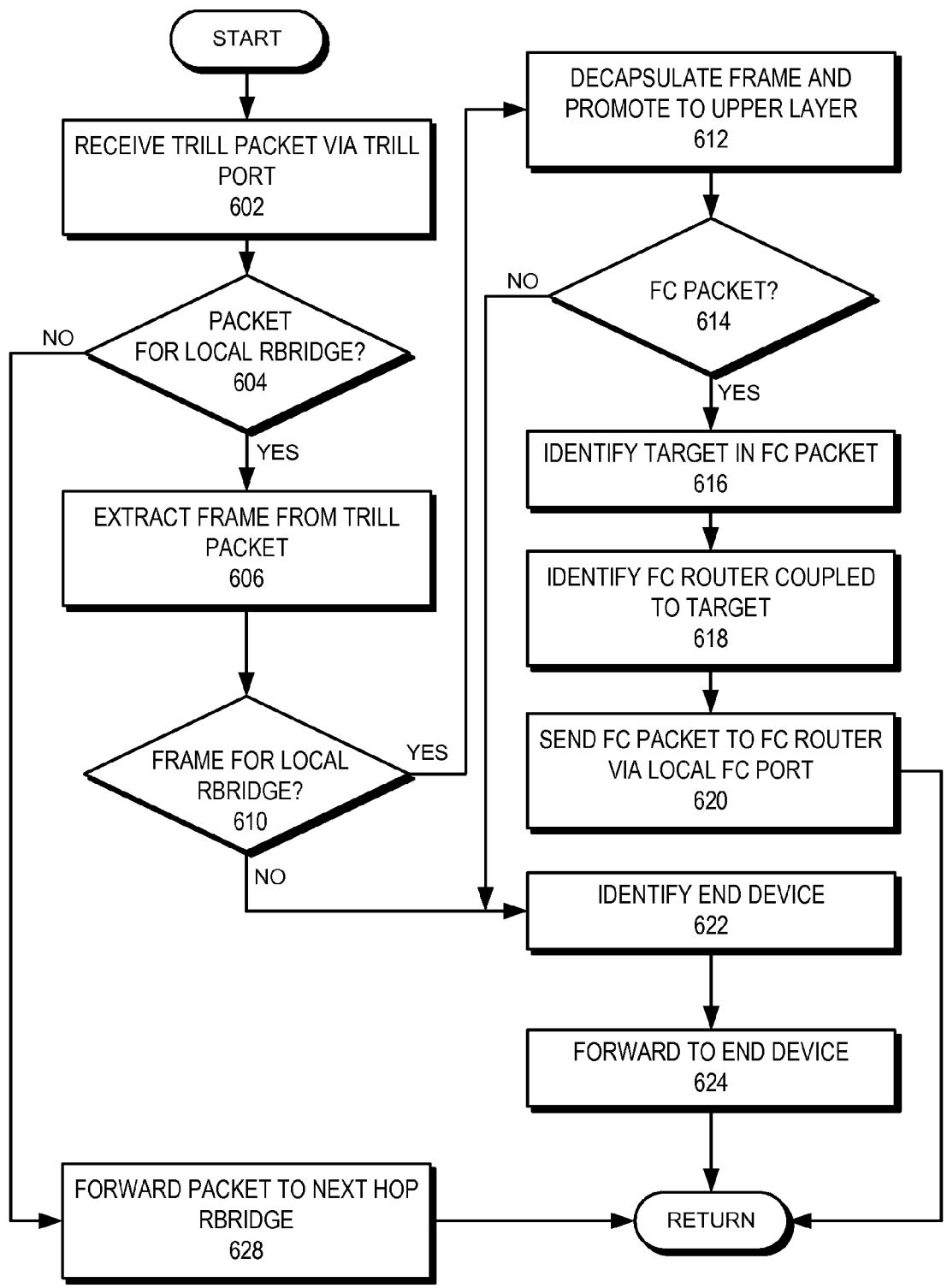
FIG. 6 presents a flowchart illustrating the process of a hybrid RBridge processing a TRILL packet, in accordance with an embodiment of the present invention.

FIG. 6 presents a flowchart illustrating the process of a hybrid RBridge processing a TRILL packet, in accordance with an embodiment of the present invention. The hybrid RBridge first receives a TRILL packet via a TRILL port (operation 602). The TRILL port couples another RBridge via an inter-switch link. The hybrid RBridge checks whether the TRILL packet is for the local RBridge (i.e., the hybrid RBridge) (operation 604). If not, the TRILL packet is for another RBridge and the hybrid RBridge forwards the packet to the next hop RBridge (operation 628). If the TRILL packet is for the local RBridge, the hybrid RBridge extracts the internal frame from the TRILL packet (operation 606). The hybrid RBridge checks whether the extracted frame is for the local RBridge (operation 610). If the frame is for the local RBridge, the hybrid RBridge decapsulates the frame and the inner packet is promoted to the upper layer (operation 612).

In some embodiments, the hybrid RBridge marks the MAC address of the virtual RBridge (i.e., the FC router) as a local MAC address. Hence, the decapsulated packet can be an FC packet for an FC router coupled to the hybrid RBridge. The hybrid RBridge checks whether the packet is an FC packet (operation 614). If so, the hybrid RBridge identifies the target of the FC packet (operation 616) and the FC router coupled to the target (operation 618). The hybrid RBridge then forwards the FC packet to the FC router via a local FC port (operation 620). In some embodiments, the FC port is an EX_port. If the frame is not for the local RBridge (operation 610), the frame is for an end device coupled to the RBridge via a layer-2 interconnection. If the internal packet is not an FC packet (operation 614), the packet is for an end device coupled to the RBridge via a layer-3 interconnection. The RBridge identifies the end device (operation 622) and forwards the frame or packet to the end device (operation 624).

Exemplary RBride

Figure 7:
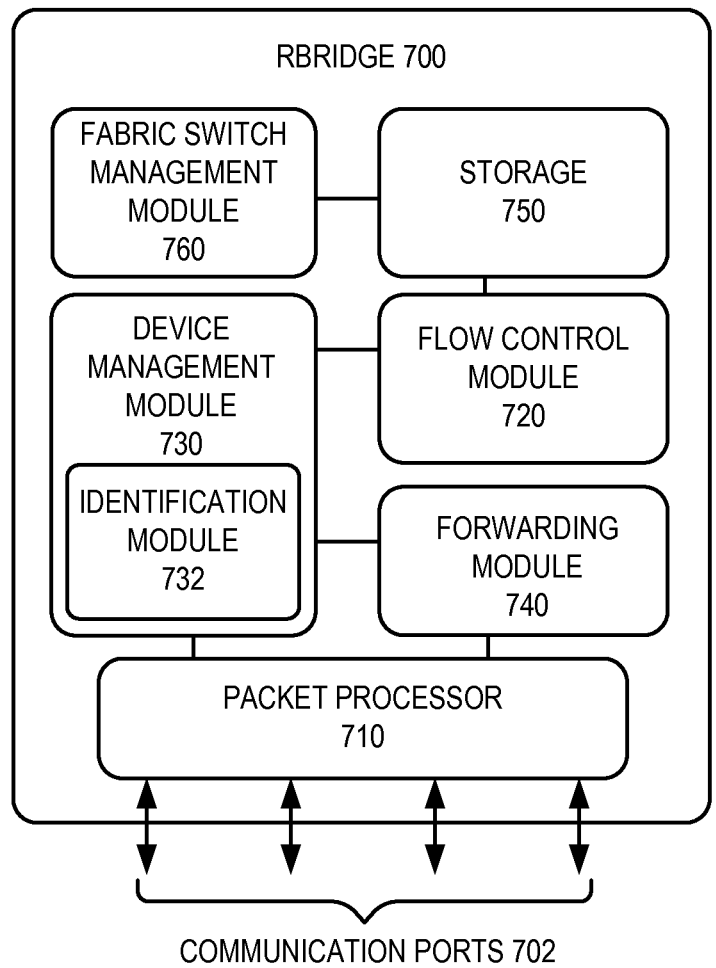
FIG. 7 illustrates an exemplary RBridge, in accordance with an embodiment of the present invention.

FIG. 7 illustrates an exemplary RBridge, in accordance with an embodiment of the present invention. In this example, an RBridge 700 includes a number of communication ports 702, a flow control module 720, a device management module 730, an identification module 732, a packet processor 710, a forwarding module 740, and a storage 750. Forwarding module 720 makes local routing decision for a respective TRILL packet using a single routing protocol instance. The TRILL packet can contain an FCoE frame or a regular Ethernet frame (i.e., a non-FC frame). RBridge 700 can generate the TRILL or the FC packet using packet processor 710, or receive via one of the communication ports 702. Examples of the routing protocol can include, but are not limited to OSPF, IS-IS, and Dis-tance-vector. Communication ports 702 can include one or more ports capable of receiving frames encapsulated in a TRILL header and/or an FC header. Packet processor 710 can process these frames.

In some embodiments, RBridge 700 may maintain a membership in a fabric switch, wherein RBridge 700 also includes a fabric switch management module 760. Fabric switch management module 760 maintains a configuration database in storage 750 that maintains the configuration state of a respective switch within the fabric switch. Fabric switch management module 760 maintains the state of the fabric switch, which is used to join other switches. Under such a scenario, communication ports 702 can include inter-switch communication channels for communication within a fabric switch. This inter-switch communication channel can be implemented via a regular communication port and based on any open or proprietary format.

During operation, RBridge 700 detects an FC router coupled to RBridge 700. RBridge 700 virtualizes the FC router and presents the FC router as a virtual RBridge to the rest of the TRILL network. Packet processor 710 constructs a notification message containing an RBridge identifier associated with the FC router. Device management module 730 operates in conjunction with packet processor 710 and checks whether a received TRILL packet has the RBridge identifier as the egress RBridge identifier. If so, device management module 730 terminates TRILL forwarding for the packet and packet processor 710 extracts an Ethernet frame from the TRILL packet. Device management module 730 identifies a MAC address of the FC router configured as a local address. If the MAC address of the Ethernet frame matches the MAC address of the FC router, packet processor 710 extracts an FC packet from the Ethernet frame.

Identification module 732 identifies a class of service associated with the FC router. Flow control module 720 then configures priority-based flow control associated with the class of service for RBridge 700. Packet processor 710 creates a notification message for a remote RBridge, which can be a member switch of a fabric switch, in response to identifying the class of service. The notification message can contain the class of service associated with the priority-based flow control configured for RBridge 700. When RBridge 700 learns information about a networking device, such as a MAC address, via one of the communication ports 702, packet processor 710 constructs a notification message for the remote RBridge containing the learned information.

Note that the above-mentioned modules can be implemented in hardware as well as in software. In one embodiment, these modules can be embodied in computer-executable instructions stored in a memory which is coupled to one or more processors in RBridge 700. When executed, these instructions cause the processor(s) to perform the aforementioned functions.

In summary, embodiments of the present invention provide a switch and a method for integrating a TRILL network with a storage area network. In one embodiment, the switch includes a packet processor and a device management module. During operation, the packet processor constructs a notification message containing a Transparent Interconnection of Lots of Links (TRILL) Routing Bridge (RBridge) identifier associated with a Fibre Channel router. The device management module operates in conjunction with the packet processor and terminates TRILL forwarding for a received TRILL packet with the RBridge identifier as an egress RBridge identifier.

The methods and processes described herein can be embodied as code and/or data, which can be stored in a computer-readable non-transitory storage medium. When a computer system reads and executes the code and/or data stored on the computer-readable non-transitory storage medium, the computer system performs the methods and processes embodied as data structures and code and stored within the medium.

The methods and processes described herein can be executed by and/or included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A first switch, comprising:
    a plurality of ports comprising a first port capable of forwarding based on a first protocol in a network of interconnected switches and a second port capable of forwarding based on a second protocol;
    a packet processor configured to:
        construct a notification message indicating a physical switch identifier of a second switch, which operates based on the second protocol, as a second switch identifier of a third switch capable of operating based on the first protocol, wherein the physical switch identifier and the second switch identifier are of a same format;
        determine the first port as an output port for the notification message, wherein the first port corresponds to another switch; and
        determine the second port as an output port for a packet with the physical switch identifier as an egress switch identifier based on the physical switch identifier, wherein the second port corresponds to the second switch.

2. The first switch of claim 1, wherein the packet processor is further configured to extract the packet by decapsulating an encapsulation header associated with the first protocol, wherein the destination address of the encapsulation header corresponds to the third switch.

3. The first switch of claim 2, wherein the packet is a Fibre Channel packet, and wherein the second switch is a Fibre Channel router.

4. The first switch of claim 1, further comprising device management circuitry configured to:
    terminate forwarding for an Ethernet header of the packet, prior to determining the second port as an output port, by identifying a media access control (MAC) address of the second switch as a local address associated with the first switch.

5. The first switch of claim 1, further comprising:
    identification circuitry configured to identify a first class of service associated with the second switch based on the second protocol; and
    flow control circuitry configured to, corresponding to the first class of service, configure a second class of service based on priority-based flow control for the first switch.

6. The first switch of claim 5, wherein the packet processor is further configured to create a notification message for a remote switch in the network of interconnected switches in response to identifying the first class of service, wherein the notification message includes the second class of service configured for the first switch.

7. The first switch of claim 1, wherein the packet processor is further configured to construct a notification message for a remote switch in the network of interconnected switches, wherein the notification message includes a MAC address learned from a port in the plurality of ports.

8. The first switch of claim 1, further comprising forwarding circuitry configured to make a local routing decision for a second packet using a routing protocol instance based on the first protocol, wherein the second packet includes an inner packet destined to a remote switch outside of the network of interconnected switches.

9. The first switch of claim 8, wherein the routing protocol corresponds to one of:
    Open Shortest Path First (OSPF);
    Intermediate System to Intermediate System (IS-IS); and
    Distance-vector.

10. The first switch of claim 1, further comprising a fabric switch management module configured to maintain a membership in the network of interconnected switches, wherein the network of interconnected switches is identified by a fabric identifier.

11. A method, comprising:
    constructing, by a first switch, a notification message, wherein the first switch includes a plurality of ports comprising a first port capable of forwarding based on a first protocol in a network of interconnected switches and a second port capable of forwarding based on a second protocol;
    wherein the notification message indicates a physical switch identifier of a second switch, which operates based on the second protocol, as a second switch identifier of a third switch capable of operating based on the first protocol,
        wherein the physical switch identifier and the second switch identifier are of a same format; and
    determining the first port as an output port for the notification message, wherein the first port corresponds to another switch; and
    determining the second port as an output port for a packet with the physical switch identifier as an egress switch identifier based on the physical switch identifier, wherein the second port corresponds to the second switch.

12. The method of claim 11, wherein the method further comprises extracting the packet by decapsulating an encapsulation header associated with the first protocol, wherein the destination address of the encapsulation header corresponds to the third switch.

13. The method of claim 12, wherein the packet is a Fibre Channel packet, and wherein the second switch is a Fibre Channel router.

14. The method of claim 11, further comprising:
    terminating forwarding for an Ethernet header of the packet, prior to determining the second port as an output port, by identifying a media access control (MAC) address of the second switch as a local address associated with the first switch.

15. The method of claim 11, further comprising:
    identifying a first class of service associated with the second switch based on the second protocol; and corresponding to the first class of service, configuring a second class of service based on priority-based flow control for the first switch.

16. The method of claim 15, further comprising creating a notification message for a remote switch in the network of interconnected switches in response to identifying the first class of service, wherein the notification message includes the second class of service configured for the first switch.

17. The method of claim 11, further comprising constructing a notification message for a remote switch in the network of interconnected switches, wherein the notification message includes a MAC address learned from a port in the plurality of ports of the first switch.

18. The method of claim 11, further comprising making a local routing decision for a second packet using a routing protocol instance based on the first protocol, wherein the second packet includes an inner packet destined to a remote switch outside of the network of interconnected switches.

19. The method of claim 18, wherein the routing protocol corresponds to one of:
   Open Shortest Path First (OSPF);
   Intermediate System to Intermediate System (IS-IS); and
   Distance-vector.

20. The method of claim 11, further comprising maintaining a membership in the network of interconnected switches, wherein the network of interconnected switches is identified by a fabric identifier.

* * * * *